(12) United States Patent
Frankel et al.

(10) Patent No.: US 12,323,199 B2
(45) Date of Patent: Jun. 3, 2025

(54) SYSTEM AND METHOD FOR DOPPLER FREQUENCY SHIFT COMPENSATION IN FREE SPACE OPTICAL LINKS

(71) Applicant: Ciena Corporation, Hanover, MD (US)

(72) Inventors: Michael Y. Frankel, Pikesville, MD (US); Vladimir Pelekhaty, Baltimore, MD (US)

(73) Assignee: Ciena Corporation, Hanover, MD (US)

( * ) Notice: Subject to any disclaimer, the term of this patent is extended or adjusted under 35 U.S.C. 154(b) by 428 days.

(21) Appl. No.: 17/952,496

(22) Filed: Sep. 26, 2022

(65) Prior Publication Data

US 2024/0113747 A1 Apr. 4, 2024

(51) Int. Cl.
*H04B 7/01* (2006.01)
*H04B 7/185* (2006.01)

(52) U.S. Cl.
CPC ............. *H04B 7/01* (2013.01); *H04B 7/185* (2013.01)

(58) Field of Classification Search
CPC ........ H04B 7/01; H04B 7/185; H04B 10/118; H04B 7/18521; H04B 7/18532; H04B 7/18519; H04B 7/18513; H04B 7/1851; H04B 7/18515; H04B 7/1858; H04B 7/18578; H04B 7/18576; H04B 10/6165; H04B 10/6164; H04B 10/503; H04B 10/61; H04B 10/612; H04W 84/06
See application file for complete search history.

(56) References Cited

U.S. PATENT DOCUMENTS

| | | | |
|---|---|---|---|
| 5,058,101 A * | 10/1991 | Albanese | H04B 7/01 398/1 |
| 5,184,241 A | 2/1993 | Schwemmer | |
| 6,243,175 B1 | 6/2001 | Pelekhaty | |
| 6,246,501 B1 * | 6/2001 | Dreischer | H04B 7/18521 398/9 |
| 6,473,213 B1 * | 10/2002 | Wandernoth | H04B 10/118 398/129 |
| 6,795,607 B1 | 9/2004 | Archambault et al. | |

(Continued)

FOREIGN PATENT DOCUMENTS

FR 0274958 A1 * 7/1988 ............... H04B 7/01

OTHER PUBLICATIONS

Qi Xiaogang et al., "A survey of routing techniques for satellite networks," Journal of Communications and Information Networks, vol. 1, No. 4, DOI: 10.11959/j.issn.2096-1081, 2016.058, Review Paper, Dec. 2016, pp. 67-85.

(Continued)

*Primary Examiner* — Lana N Le
(74) *Attorney, Agent, or Firm* — Baratta Law PLLC; Lawrence A. Baratta, Jr.

(57) ABSTRACT

Systems and methods for Doppler frequency shift compensation in free space optical links include a modulator configured to modulate a transmitter laser; a receiver including a Local Oscillator (LO) laser configured to receive a coherent signal; and circuitry configured to tune a frequency of the transmitter laser and the LO laser based on an amount of Doppler frequency shift to be compensated. The systems and methods determine an amount of Doppler shift between a first and second satellite and tune the frequency of the transmitter and LO laser based on the determined amount of Doppler frequency shift.

20 Claims, 24 Drawing Sheets

(56) References Cited

U.S. PATENT DOCUMENTS

| | | |
|---|---|---|
| 7,184,215 B2 | 2/2007 | Pelekhaty |
| 7,415,208 B1 | 8/2008 | Haggans et al. |
| 7,853,156 B2 | 12/2010 | Grigoryan et al. |
| 7,853,157 B2 | 12/2010 | Grigoryan et al. |
| 8,005,375 B2 | 8/2011 | Frankel |
| 8,625,994 B2 | 1/2014 | Archambault et al. |
| 8,699,880 B2 | 4/2014 | Grigoryan et al. |
| 8,977,125 B2 | 3/2015 | Grigoryan et al. |
| 9,191,117 B2 | 11/2015 | Alexander et al. |
| 9,270,405 B2 | 2/2016 | Blair et al. |
| 9,374,166 B2 | 6/2016 | Mateosky et al. |
| 9,509,410 B2 | 11/2016 | Mateosky et al. |
| 9,515,767 B2 | 12/2016 | Frankel et al. |
| 9,551,836 B2 | 1/2017 | Frankel et al. |
| 10,141,926 B2 | 11/2018 | Frankel et al. |
| 10,142,092 B2 | 11/2018 | Pelekhaty et al. |
| 10,171,169 B2 | 1/2019 | Frankel et al. |
| 10,194,221 B2 | 1/2019 | Frankel et al. |
| 10,200,305 B2 | 2/2019 | Frankel et al. |
| 10,212,496 B2 | 2/2019 | Frankel et al. |
| 10,313,014 B2 | 6/2019 | Frankel et al. |
| 10,313,021 B1 | 6/2019 | Frankel et al. |
| 10,404,365 B2 | 9/2019 | Frankel et al. |
| 10,476,815 B2 | 11/2019 | Frankel et al. |
| 10,715,888 B2 | 7/2020 | Swinkels et al. |
| 10,749,602 B2 | 8/2020 | Charlton et al. |
| 11,026,001 B1 | 6/2021 | Frankel et al. |
| 11,063,667 B1 | 7/2021 | Ritter |
| 11,128,373 B1 | 9/2021 | Podmore et al. |
| 12,101,170 B2 * | 9/2024 | Miao ................. H04B 7/18532 |
| 2005/0100271 A1 | 5/2005 | Frankel |
| 2012/0281740 A1 | 11/2012 | Fujita et al. |
| 2017/0096242 A1 * | 4/2017 | Alfano ................. H04B 7/185 |
| 2018/0254824 A1 * | 9/2018 | Speidel ............. H04B 7/18532 |
| 2018/0269972 A1 | 9/2018 | Djordjevic et al. |
| 2019/0028197 A1 | 1/2019 | Turner et al. |
| 2019/0182180 A1 | 6/2019 | Frankel et al. |
| 2020/0236064 A1 | 7/2020 | Frankel et al. |
| 2021/0058685 A1 | 2/2021 | Frankel et al. |
| 2021/0075746 A1 | 3/2021 | Frankel et al. |
| 2022/0209868 A1 | 6/2022 | Frankel et al. |
| 2022/0376743 A1 * | 11/2022 | Chen ................. H04B 7/18513 |
| 2023/0208493 A1 * | 6/2023 | Abebe ..................... H04B 7/01 |

OTHER PUBLICATIONS

Hemani Kaushal et al., "Optical Communication in Space: Challenges and Mitigation Techniques", IEEE Communications Survey and Tutorials, vol. 19, No. 1, May 28, 2017, 41 Pages.

Toshiyuki Ando et al., "Coherent homodyne receiver with a compensator of Doppler shifts for inter orbit optical communication", Free-Space Laser Comminication Technologies XXIII, vol. 7923, No. 1. Feb. 10, 2011, 11 Pages.

Jan. 8, 2024, International Search Report and Written Opinion for International Patent Application No. PCT/US2023/033603.

* cited by examiner $\varphi_0 = 90°$     $\varphi_0 = 45°$ $\varphi_0 = 1°$ $\varphi_0 = 90°$ $\varphi_0 = 45°$ $\varphi_0 = 1°$ $\varphi_0 = 90°$ $\varphi_0 = 45°$ $\varphi_0 = 1°$ $\varphi_0 = 90°$ $\varphi_0 = 45°$ $\varphi_0 = 1°$ $\varphi_0 = 90°$ $\varphi_0 = 45°$ $\varphi_0 = 1°$ $\varphi_0 = 90°$ $\varphi_0 = 45°$ $\varphi_0 = 1°$

SYSTEM AND METHOD FOR DOPPLER FREQUENCY SHIFT COMPENSATION IN FREE SPACE OPTICAL LINKS

FIELD OF THE DISCLOSURE

The present disclosure generally relates to satellite networking. More particularly, the present disclosure relates to system and method for Doppler frequency shift compensation in free space optical links.

BACKGROUND OF THE DISCLOSURE

Coherent optical communications between satellites are subject to Doppler shift of laser wavelength (or frequency). This phenomenon is exhibited most prominently when communicating satellites are propagating in counter-rotating circular orbits with small angles between their orbit planes. In various scenarios, satellites are first approaching, and then moving apart from each other at almost double the first cosmic velocity (orbital velocity), resulting in a large Doppler frequency shift.

Proliferation of Multi-Satellite Systems (MSS) in both GEO (Geostationary Earth Orbit), MEO (Middle Earth Orbit) and LEO (Low Earth Orbit) has expanded personal voice and data communications and Internet in space. A satellite constellation is a group of artificial satellites working together as a system. Unlike a single satellite, a constellation can provide permanent global or near-global coverage, such that at any time everywhere on Earth at least one satellite is visible. Satellites are typically placed in sets of complementary orbital planes and connect to globally distributed ground stations. They may also use Inter-Satellite Communications (ISC). LEO MSS fly in formations including equally distanced satellites daisy-chained within separate orbital planes. Inter-Satellite Communications (ISC) are established by means of Inter-Satellite Links (ISL), which are distinguished as intra-plane (i.e., within a single orbit) and inter-plane (i.e., cross-orbit).

The ISLs are generally based on existing legacy routing by closest proximity between the satellites in LEO MSS. State of the art routing between satellites in a constellation is described in QI X G, MA J L, WU D, et al. A survey of routing techniques for satellite networks[J]. Journal of communications and information networks, 2016, 1(4): 66-85., the contents of which are incorporated by reference. This topological solution implies the standard routing procedures through the mesh-grid or 2D Torus networks. Drawbacks of the legacy ISC routing by proximity based on mesh-grid topology are excessive number of hop and zigzag shaped physical paths between the source and destination, resulting in increased latency. Many more satellites and their corresponding modems are involved in relaying the traffic in the process, resulting in increased power consumption, both through modem count and by requiring modems to run in higher-power, higher-capacity modes.

Within the legacy mesh-grid topology based on closest proximity of satellites the information is routed through the mesh-grid network of satellites in not quite straight zigzag path and involves number of hops between the satellites (8 hops between Starlink satellites over two most populous hubs in continental US, to be specific), utilizing as a result significant number of modems in a process, all of it resulting in increased latency and power consumption. It should also be noted that when packets traverse a modem, they consume network capacity, i.e., effective network load is a product of injected bit rate times number of hops a bit takes.

BRIEF SUMMARY OF THE DISCLOSURE

In an embodiment, a coherent transceiver for use in satellites includes: a transmitter including a modulator configured to modulate a transmitter laser light; a receiver including a Local Oscillator (LO) laser configured to receive a coherent signal; and circuitry configured to tune a frequency of the transmitter laser and the LO laser based on an amount of Doppler shift to be compensated. The transmitter laser and the LO laser can be tuned in opposite directions. The transmitter laser frequency is decreased in a first of two approaching satellites and the LO laser frequency is increased in a second of two approaching satellites by an amount equal to half of the amount of positive Doppler shift to be compensated. The transmitter laser frequency is increased in a first of two satellites moving away from each other, and the LO laser frequency is decreased in a second of two satellites moving away from each other by an amount equal to half of the amount of negative Doppler shift to be compensated. Responsive to a first and second satellite approaching each other, the circuitry is further configured to: set a transmitter laser frequency to a near lowest edge of a fine-tuning range for both satellites, determine an LO laser setting, and tune the transmitter laser and LO laser to maximize future tuning range. Responsive to a first and second satellite moving away from each other, the circuitry is further configured to: set a transmitter laser frequency to a near highest edge of a fine-tuning range for both satellites, determine an LO laser setting, and tune the transmitter laser and LO laser to maximize future tuning range. Only the LO laser is tuned responsive to a maximum Doppler shift not exceeding a maximum frequency tuning range of the LO laser. The satellites are configured to operate in a constellation. The constellation of satellites can be in Low Earth Orbit (LEO). The constellation of satellites can be in Middle Earth Orbit (MEO).

In another embodiment, a method for compensating Doppler shift in satellites includes steps of: determining an amount of Doppler shift between a first and second satellite; tuning a frequency of a transmitter laser of the first satellite based on the determined amount of Doppler shift; and tuning a frequency of an LO laser of the second satellite based on the determined amount of Doppler shift. The transmitter laser and the LO laser can be tuned in opposite directions. The transmitter laser frequency is decreased in the first satellite and the LO laser frequency is increased in the second satellite by an amount equal to half of the amount of positive Doppler shift to be compensated when satellites are approaching each other. The transmitter laser frequency is increased in the first satellite and the LO laser frequency is decreased in the second satellite by an amount equal to half of the amount of negative Doppler shift to be compensated when satellites are moving away from each other. Responsive to the first and second satellite approaching each other, the steps further include: setting a transmitter laser frequency to a near lowest edge of a fine-tuning range for both satellites, determining an LO laser setting, and tuning the transmitter laser and LO laser to maximize future tuning range. Responsive to the first and second satellite moving away from each other, the steps further include: setting a transmitter laser frequency to a near highest edge of a fine-tuning range for both satellites, determining an LO laser setting, and tuning the transmitter laser and LO laser to maximize future tuning range. Only the LO laser is tuned responsive to a maximum Doppler shift not exceeding a maximum frequency tuning range of the LO laser. The satellites can be configured to operate in a constellation. The constellation of satellites can be in Low Earth Orbit (LEO). The constellation of satellites can be in Middle Earth Orbit (MEO).

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
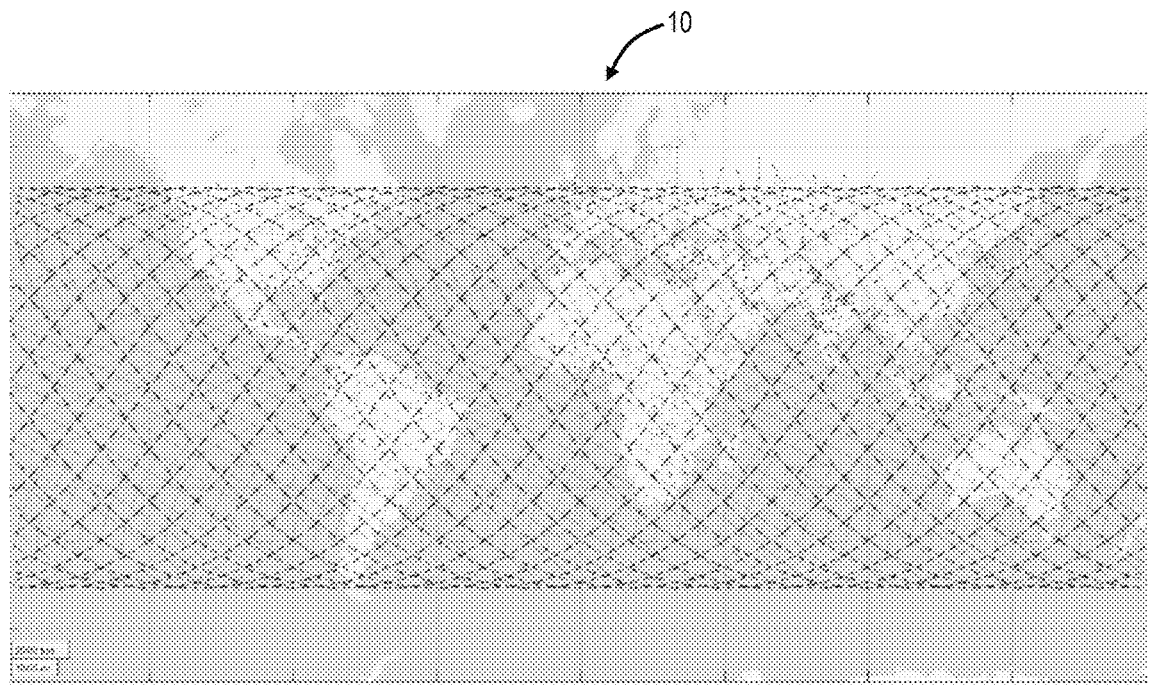
FIG. 1 is a map of the Earth illustrating an example LEO network (the Starlink satellite network).

The present disclosure includes a pseudo-static map of data source/sinks that require satellite interconnection, e.g., based on populations, data facilities, etc. The orbit altitude defines line of sight distance constraints. ISL link software-defined coherent optical modems determine dependence of available link bandwidth versus optical distance. The topological connections are established using compound graph algorithms that partition the network into sub-clusters, optimize sub-cluster connectivity for lowest diameter network with high throughput and low latency, optimize inter-cluster connectivity for lowest diameter composite network with high throughput and low latency, and connections are enforced to respect constraints on line of sight, reach, link capacity, angular pointing of ISL telescopes, etc.

Specific satellites are associated with a particular topological location when they enter a defined 'affinity area' in close proximity to the location (for LEO, MEO MSSs). Relay satellites are invoked when line of sight, reach, link capacity, etc. exceed direct-connect capability. Multiple satellites can be allocated to affinity areas if ground links are available and to relay functions if additional path redundancy or capacity is required. Additional satellites can be added to the constellation to provide coverage for low population density areas, typically with much lower ISL link capacities and power consumption. Examples are described herein assuming LEO constellations for illustration purposes, but satellites in MEO and even GEO orbits could be included.

Observations

The present disclosure was based on the following observations related to coherent optical modems (coherent transceivers):

Space links scale very differently from fiber links. For fiber, two concatenated 30 dB fibers add to 60 dB. For space, two concatenated 30 dB links add to 36 dB (i.e., free-space loss scales as $R^2$). Thus, space links can extend much farther than fiber links.

Space links are Amplified Spontaneous Emission (ASE)-limited by the pre-amplifier, and coherent receivers have much better sensitivity especially for higher cardinality constellations, compared to direct-detect receivers. It is also more power-efficient to optically amplify the weak incoming signal than provide a very high-power Local Oscillator (LO).

Coherent DSP allows dynamic adaptation to match capacity to link reach at the lowest power consumption.

For purpose of the topology, it is assumed traffic sources and sinks are generally known. The sources and sinks could be geographically static, i.e., associated with population density or locations of data centers or locations of other large traffic generation facilities, and could depends on a particular customer mix.

Geostationary satellite links could be assumed 'geographically static.'

Dynamic sources of data could be included but are not likely to generate a sufficient quantity of data to perturb assumed topological constraints.

Conventional LEO MSS ISC Links

Figure 2:
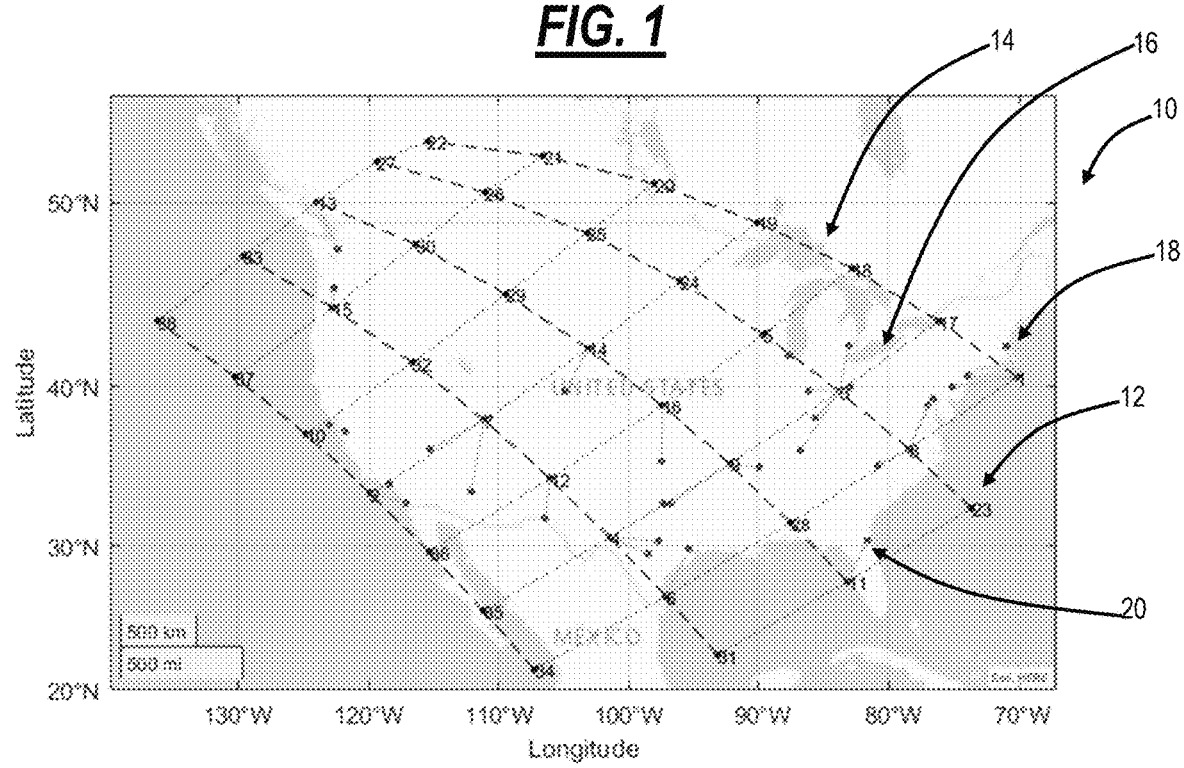
FIG. 2 is a map of the continental U.S. illustrating the LEO network of FIG. 1 including 30 most populous U.S. cities.

LEO MSS fly in formations including typically equally distanced satellites daisy-chained within separate orbital planes. FIG. 1 is a map of the earth illustrating an example LEO network 10 (the Starlink satellite network). FIG. 2 is a map of the continental U.S. illustrating the LEO network 10 including 30 most populous U.S. cities. For illustration purposes, the satellites in ascending orbits of Starlink satellite network are shown as an example LEO MSS to provide Internet Access. The present disclosure contemplates various other LEO MSS as well as MEG MSS and GEO MSS.

Figure 3:
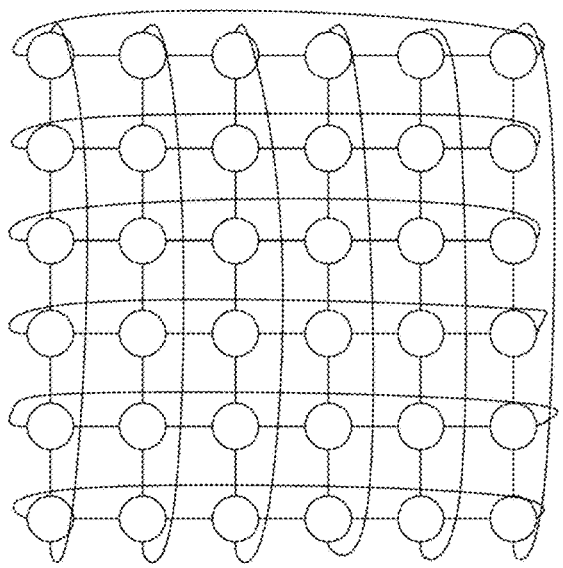
FIG. 3 is a network diagram of a Mesh-grid (2D Torus) topology with degree of 4 representative of a conventional LEO MSS.

Each satellite includes multiple optical modems to form ISC links, which in conventional legacy approaches are distinguished as intra-plane (i.e., within a single orbit) and inter-plane (i.e., cross-orbit). ISC links (i.e., ISL) are established between the satellites in closest proximity by means of four modems: two for intra-plane ISLs and two for inter-plane ISLs. Circular orbital intra-plane ISLs together with inter-plane ISLs form a network whose mesh-grid topology is very similar to a 2D Torus with degree of 4, as illustrated in FIG. 3.

The example Starlink constellation under analysis includes 66 satellites per each of 24 53°-inclined orbital planes. A snapshot of a local satellite network including a group of satellites in ascending orbits over the continental US is frozen in time and shown in FIG. 2. In FIG. 2, satellites 12 are dots. Dashed lines are intra-plane ISLs 14 and also indicate orbital planes, while dotted line are inter-plane ISLs 16, together illustrating a relevant mesh-grid portion of the satellite network 10. Dots are 30 most populous cities 18 in the U.S. Lines 20 indicate which satellite 12 is connected to which city 18, but are not necessarily physical links, i.e., they could represent terrestrial traffic aggregation to a single ground station hub. Only 16 out of 38 satellites are connected to the ground stations hubs and they are numbered 1 through 16 in accordance with the total population of the cities within the corresponding ground hub—from higher to lower—for the purpose of further analysis.

Again, within the legacy mesh-grid topology based on closest proximity of satellites 12 the information is routed through the mesh-grid network of satellites 12 in not quite straight zigzag path and involves number of hops between the satellites 12 (8 hops between satellites over two most populous hubs, to be specific), utilizing as a result significant number of modems in the process, all of it resulting in increased latency and power consumption. It should also be noted that when packets traverse a modem, they consume network capacity, i.e., effective network load is a product of injected bit rate times number of hops a bit takes.

Figure 4:
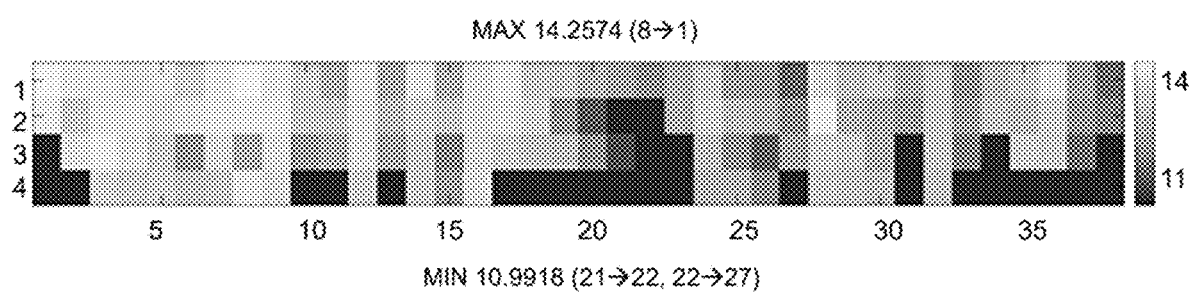
FIG. 4 is a shaded logarithmic ISL occupancy map in local mesh-grid topology satellite network; on the horizontal axis is hub/satellite number, and the vertical axis is transmitting modem number.

Drawbacks of the legacy ISL routing by proximity based on mesh-grid topology are excessive number of hops and zigzag shaped physical path between the source and destination, resulting in increased latency. Many more satellites and their corresponding modems are involved in relaying the traffic in the process, resulting in increased power consumption, both through modem count and by requiring modems to run in higher-power, higher-capacity modes. This is illustrated by simulated ISL occupancy, assuming the traffic between the hubs/satellites is proportional to the product of their corresponding connected city populations, shown in FIG. 4. Traffic is routed using Equal-Cost Multi-Path (ECMP) routing across equal hop count paths, if available. It is obviously seen that in legacy case, ISL occupancy spans the broad range of over three orders of magnitude, encompassing both ISLs with extremely high occupancy as well as plenty of ISLs with much lower occupancy.

Figure 5:
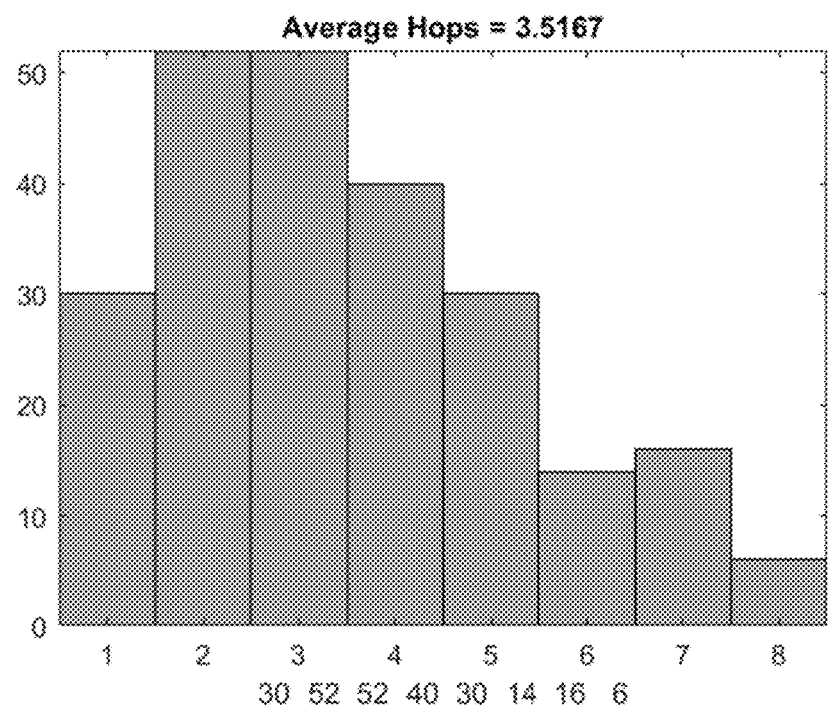
FIG. 5 is a histogram of the distribution of number of hops in the conventional LEO MSS, showing both average number of hops and numerical values of the distribution.
Figure 6:
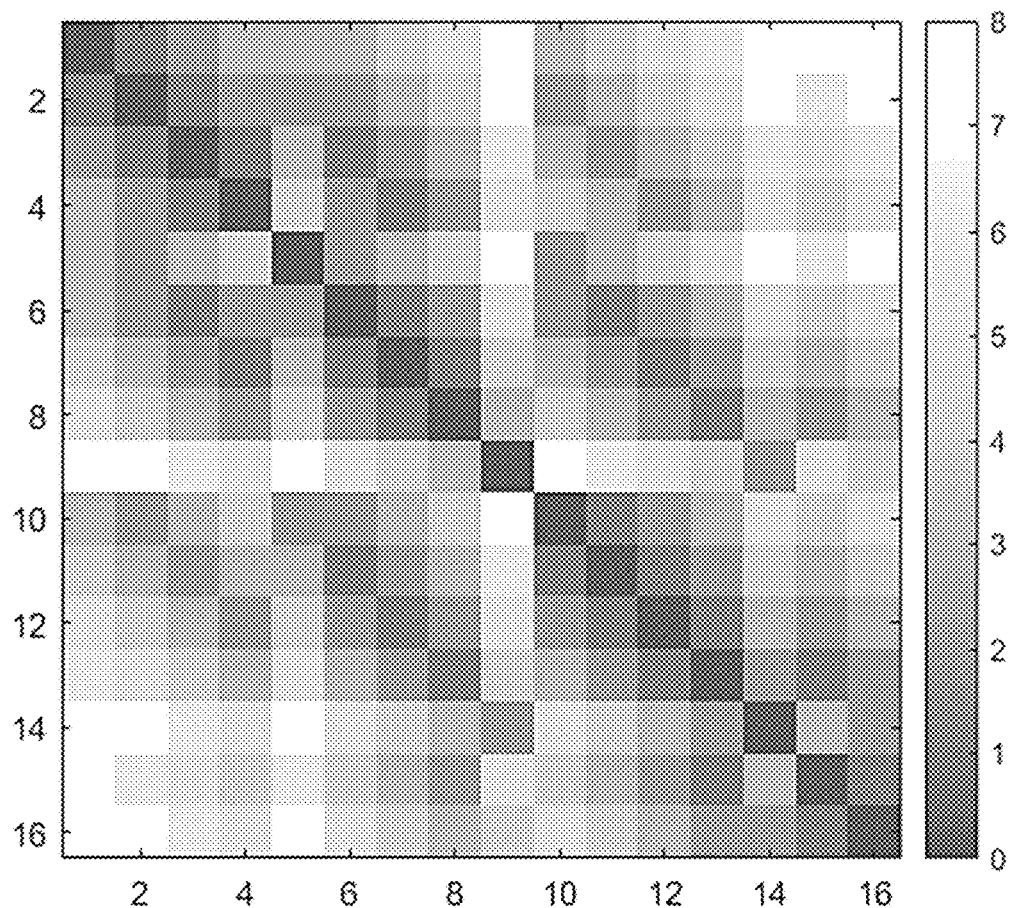
FIG. 6 is a shaded map of distances in hops for any pair of hubs/satellites in the conventional LEO MSS of FIG. 2.

The latency in the case of legacy routing by proximity is affected by number of hops from source hub/satellite to destination hub/satellite. A histogram of the distribution of number of hops is in FIG. 5, showing both average number of hops and numerical values of the distribution. FIG. 6 is a shaded map of distances in hops for any pair of hubs/satellites. The maximum distance is 8 hops.

There are two cumulative parameters used for comparative analysis of legacy mesh-grid topology with the new innovative Express-Mesh topology presented herein:

1) Network load, defined as a sum for all pairs of hubs/satellites of traffic (as product of the populations) times number of hops between them (normalized). Network Load ~4.8 for the legacy routing by proximity in the mesh-grid topology.
2) Network latency, defined as a sum of traffic times the physical distance in kilometers (normalized). Network latency ~7.7.

Topological Innovations

The present disclosure includes an innovative Express-Mesh topology based on direct ISL interconnections between the satellites over ground station hubs (16 of them in an example case) within their mutual range. Direct ISLs are prioritized between the most populous hubs to reduce the number of hops between source and destination and provide the shortest physical link length for reduced latency. Another benefit of this new Express-Mesh topological innovation is in drastically reduced number of satellites and their modems actively involved in the relaying the information. The idle modems can be powered down temporarily completely to reduce the power consumption or can be put into a low-power low-capacity mode to support other traffic not accounted for in this simplified analysis. The satellites would need to maintain at least some low-bandwidth connection to the rest of the network, likely using two modems for redundancy in a low-bandwidth mode, for command and control plane functions, for rapid failover in case of other satellite failures, and for carrying low-bandwidth traffic from sparsely distributed data sources like ocean vessels, etc.

Figure 7:
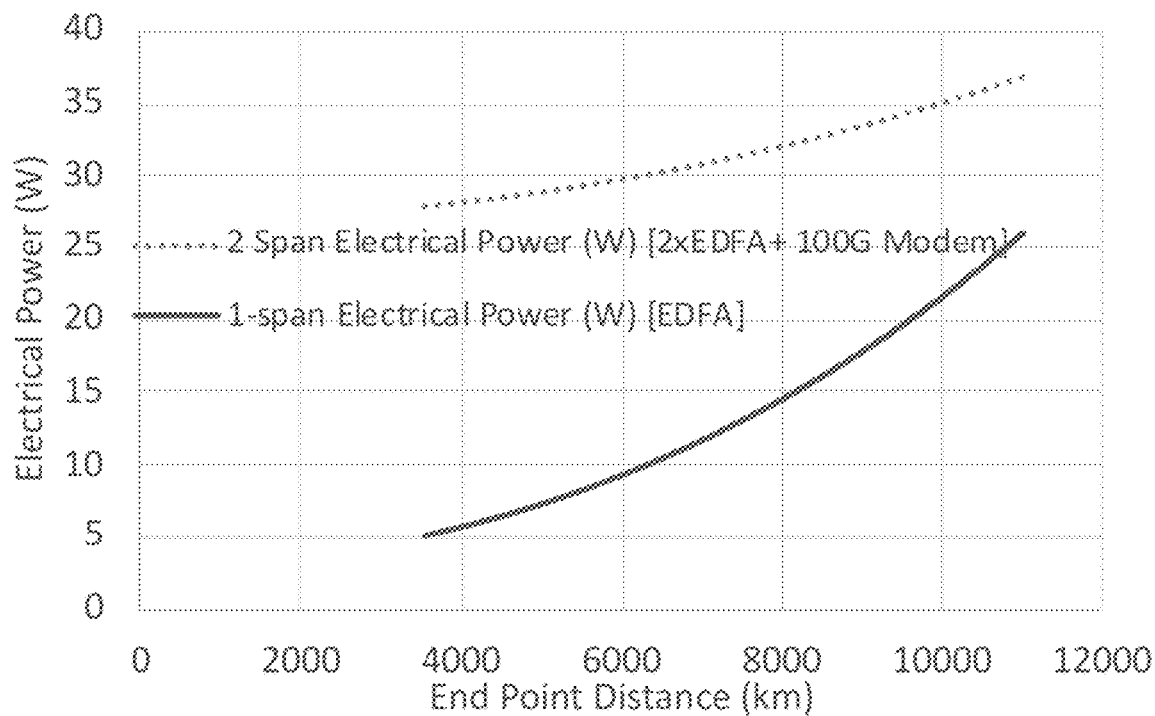
FIG. 7 is a graph of total incremental ISL power consumption with either 1 or 2 hops covering end-point separation.

Of note, unlike terrestrial links, satellite links gain in efficiency if intermediate satellites can be avoided. An optical link with 2× direct interconnect distance is much more efficient than 2× optical links going through an intermediate satellite, as shown in FIG. 7, assuming 100 Gb/s modem performance.

Unlike the legacy network, the Express-Mesh network topology attempts to reduce satellite utilization and latency by providing more direct connections among nodes (satellites) 12. For example, the 30 source/destination cities 18 from FIG. 2 are aggregated into 16 satellites 12 based on overhead proximity. Of course, since each satellite 12 has only four links formed by four coherent optical modems, a full mesh of only five hubs/satellites is possible, but among 16 satellites, a full mesh cannot be established. Therefore, some demands still take additional hops through the network.

Figure 8:
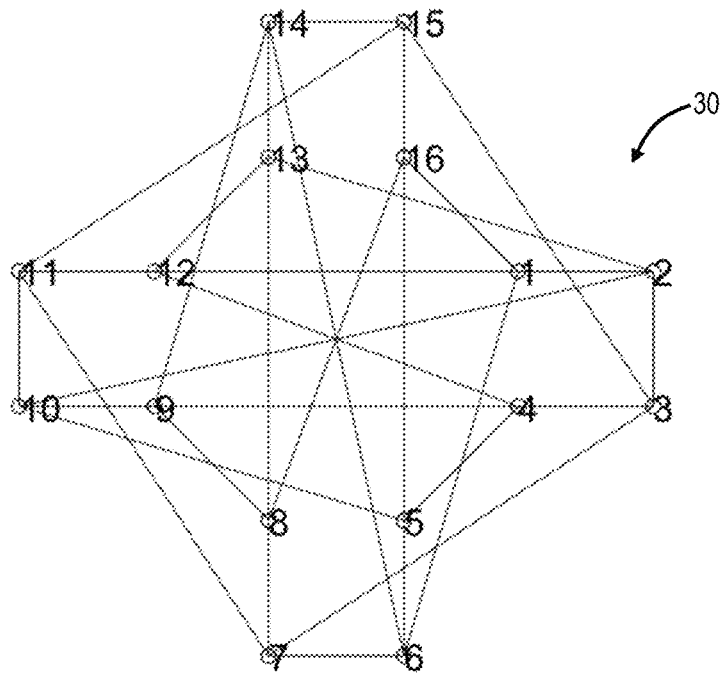
FIG. 8 is a network diagram of an Express-Mesh network topology for the 30 most populous source/destination cities from FIG. 2.
Figure 9:
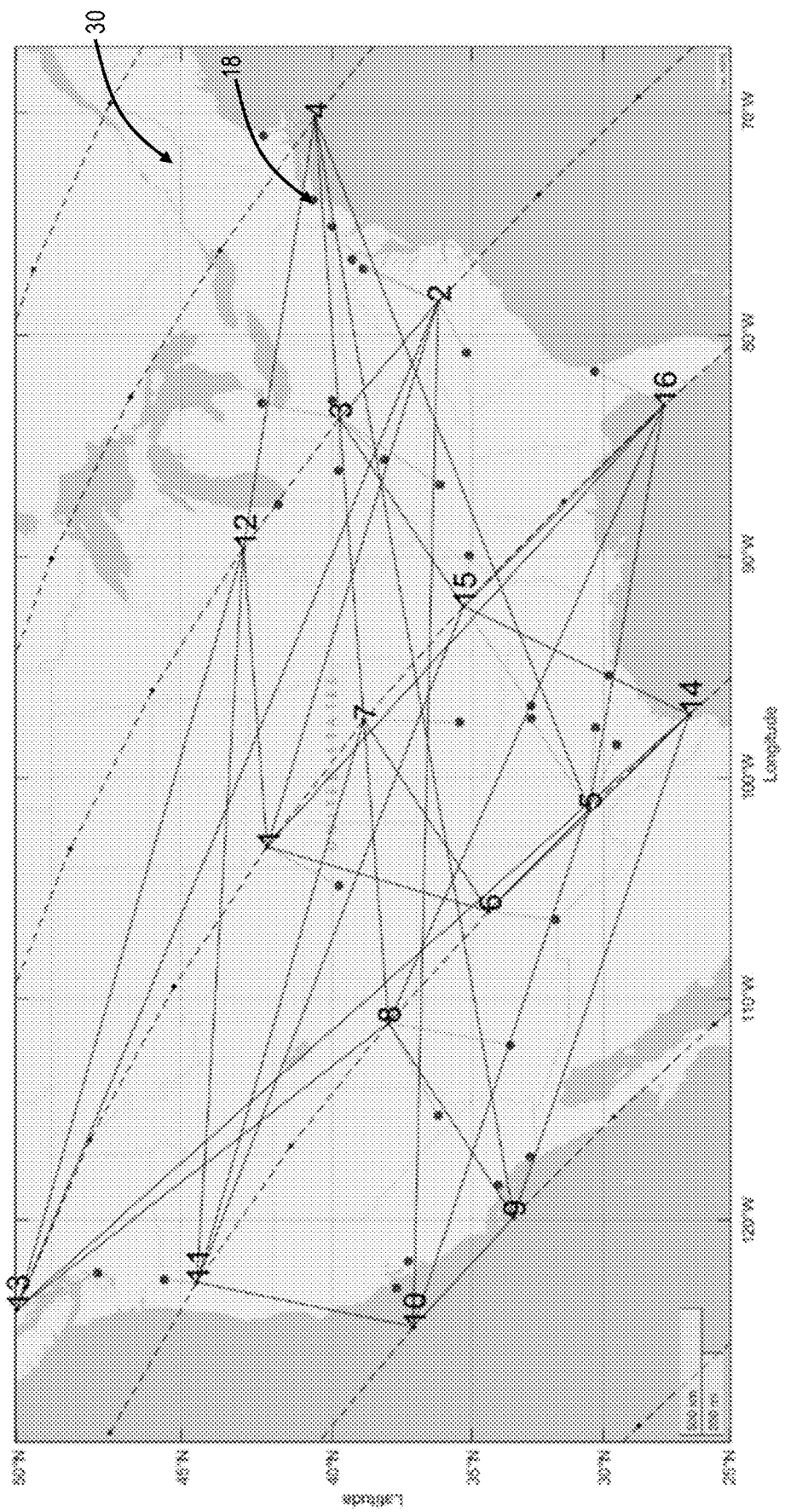
FIG. 9 is a map of the continental U.S. with the same satellites from the LEO network of FIG. 1 with an optimal 16 four-degree node Express-Mesh topology connecting 16 hubs/satellites into diameter 3 local satellite network.

FIG. 8 is a network diagram of an Express-Mesh network topology 30 for the 30 source/destination cities 18 from FIG. 9. The optimal Express-Mesh network topology 30 of 16 four-degree nodes having as low as 3 hops maximum (which is also called diameter) is in FIG. 8. This Express-Mesh network topology 30 ensures the closest possible connections between the most populated hub/satellites, while maintaining the maximum number of hops not exceeding three. There are actually only two pairs of hubs/satellites at the distance of three hops, i.e., nodes 1 and 9 and nodes 5 and 13, resulting in majority of connections including one or two hops with 1.75 hops on average.

This new optimal Express-Mesh topology is overlaid on the same snapshot of Starlink satellites as FIG. 2, albeit with #1 through #16 being connected, as is illustrated in FIG. 9. Satellites are numbered in this case in accordance with the nodes of the optimal network illustrated in FIG. 8.

Figure 10:
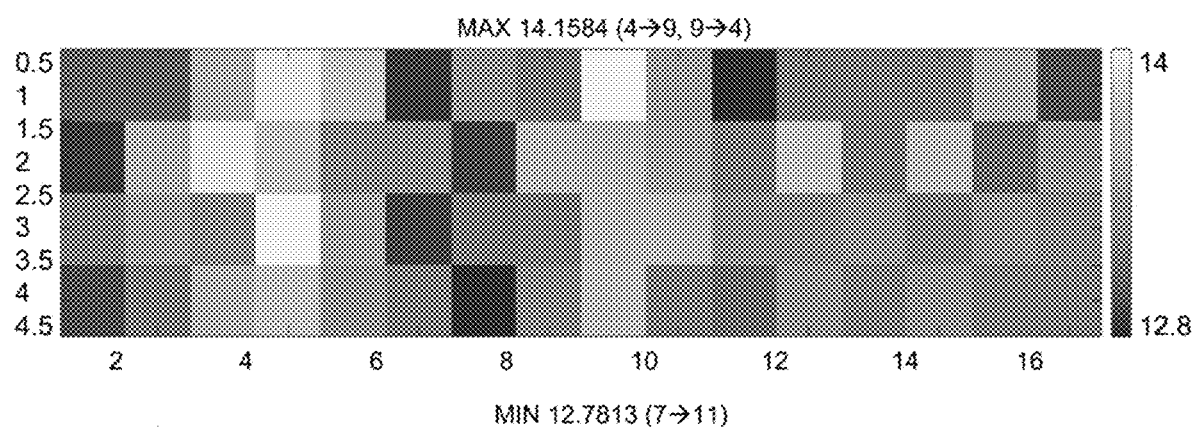
FIG. 10 is a shaded logarithmic ISL occupancy graph in local Express-Mesh topology satellite network of FIG. 9; on horizontal axis is hub/satellite number, and the vertical axis is transmitting modem number.

The simulated ISL occupancy for new optimal Express-Mesh topology, similarly assuming the traffic between the hubs/satellites is proportional to the product of their corresponding populations, is shown in FIG. 10. Again, traffic is routed using ECMP across equal hop count paths, if available. This is for comparison with FIG. 4. It is obviously seen that in case of Express-Mesh topology ISL occupancy spans much narrower range of just little bit over an order of magnitude, with all ISLs having much more uniform occupancy, maximum of it being smaller than that for legacy routing by proximity.

Figure 11:
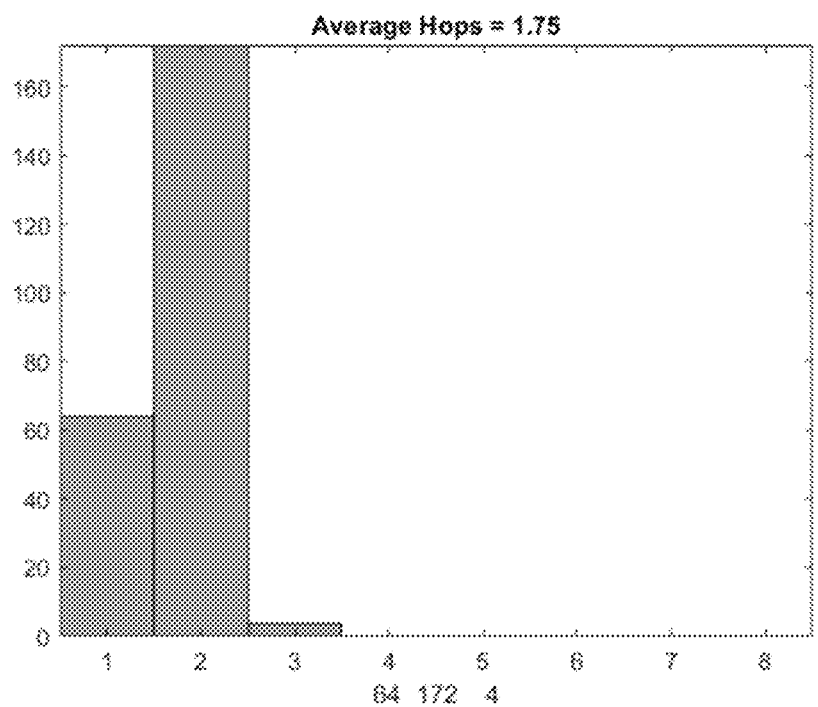
FIG. 11 is a histogram of the distribution of number of hops in the Express-Mesh topology satellite network of FIG. 9, showing both average number of hops and numerical values of the distribution.
Figure 12:
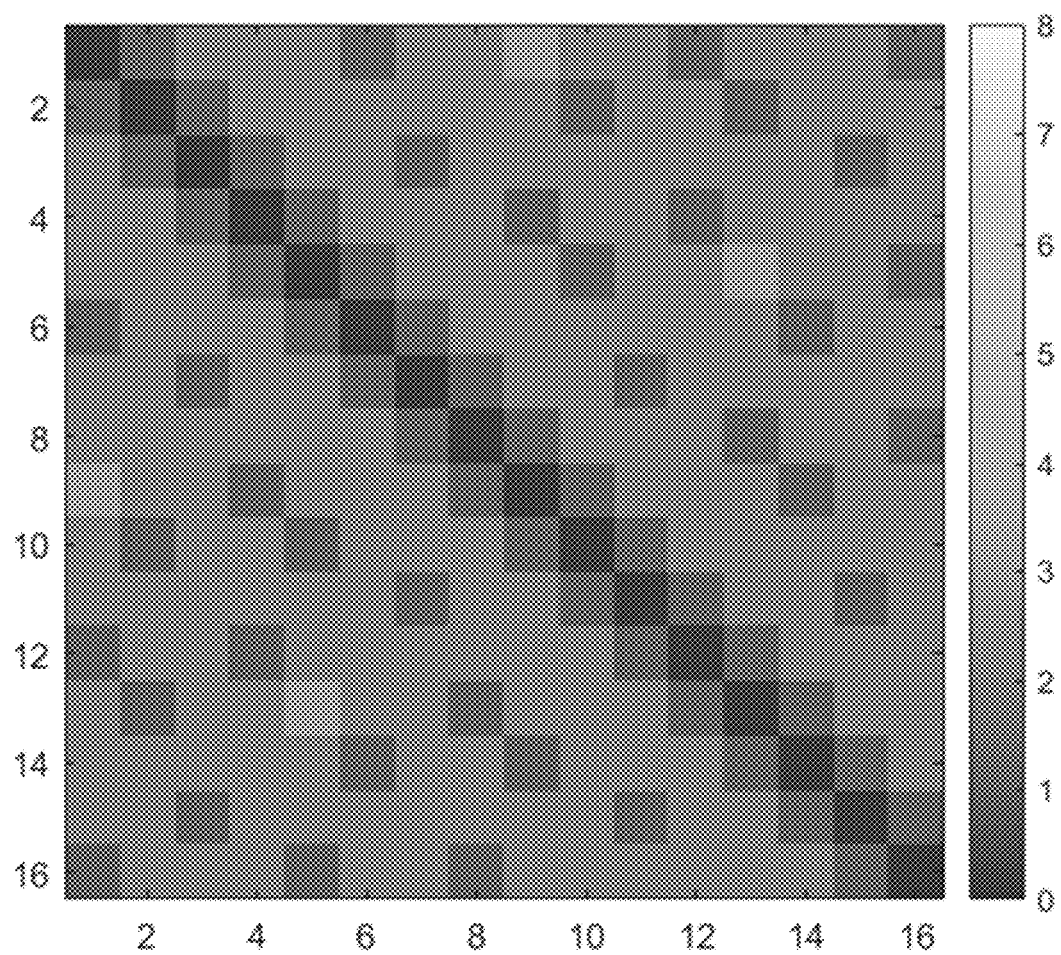
FIG. 12 is a shaded map of distances in hops for any pair of hubs/satellites in the Express-Mesh topology satellite network of FIG. 9.

Also, latency in the Express-Mesh is reduced due to smaller number of hops from source hub/satellite to destination hub/satellite. A histogram of the distribution of number of hops is shown in FIG. 11, showing both average number of hops and numerical values of the distribution. FIG. 12 is a shaded map of distances in hops for any pair of hubs/satellites. Maximum distance is just 3 hops. FIG. 12 uses the same shading scale as FIG. 6 for easier comparison.

The two cumulative parameters for new innovative Express-Mesh topology are:

1) Network load, defined as a sum for all pairs of hubs/satellites of traffic (as product of the populations) times number of hops between them (normalized). Network Load is ~2.1.
2) Network latency, defined as a sum of traffic times the physical distance in kilometers (normalized). Network latency is ~3.9.

These statistic metrics for both Mesh-Grid (2D torus) and Express-Mesh topologies are comparatively presented in the Table 1.

TABLE 1

Comparative metrics for Mesh-Grid and Express-Mesh local satellite networks over continental US.

|  | Average hops | Maximum hops | Network Load | Average Network Latency | Number of Modems |
|---|---|---|---|---|---|
| Mesh-Grid | 3.5167 | 8 | ~4.8 | ~7.7 | 126 |
| Express-Mesh | 1.75 | 3 | ~2.1 | ~3.9 | 64 |
| Ratio | 2:1 | 2.7:1 | 2.3:1 | 2:1 | 2:1 |

Example Global Satellite Network

FIG. 1 illustrates the global example Starlink constellation under analysis and includes 66 satellites per each of 24 53°-inclined orbital planes having 1584 satellites total. Satellites in ascending/descending parts of the orbit are marked as different shaded dots. Contrasted dashed shaded lines are intra-plane ISLs and also indicate south/north bound parts of orbital planes, while dotted line are inter-plane ISLs, together illustrating the global mesh-grid satellite network of 1584 satellites. Lines indicate which satellite is connected to which city, but are not necessarily physical links, i.e., they could represent terrestrial traffic aggregation to a single ground station hub. Only 199 out of 1584 satellites are connected to the ground hubs. Satellites are numbered cumulatively in 66 consecutive numbers per each of 24 orbits (numbers are not shown in FIG. 1 to avoid clutter).

Figure 13:
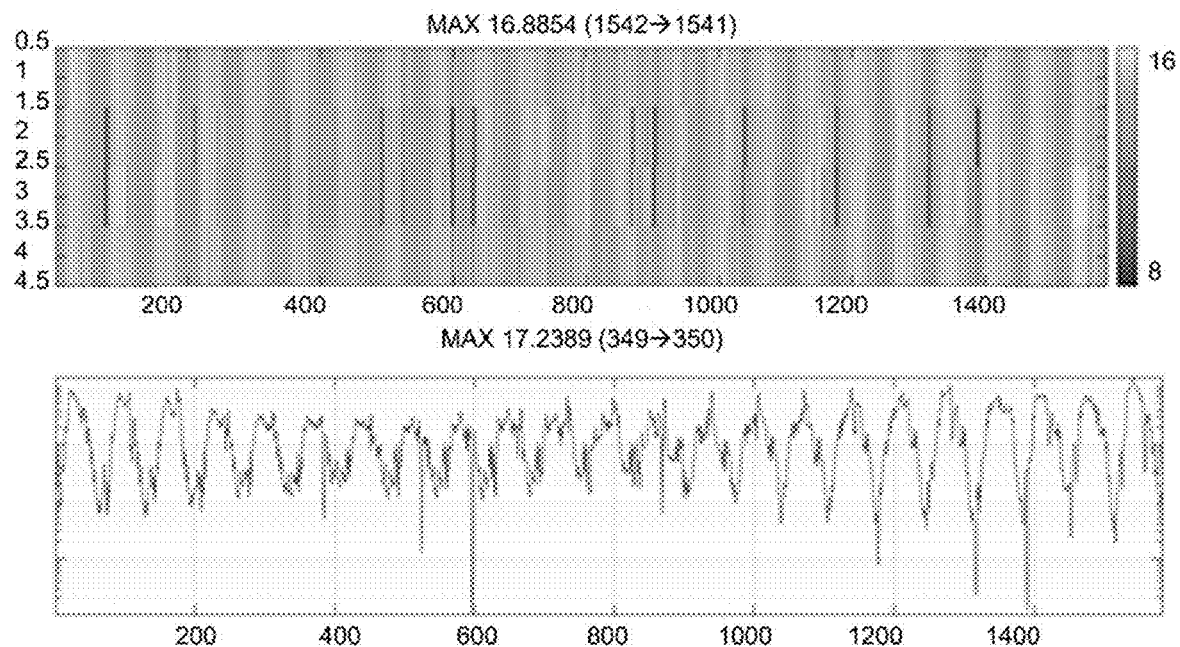
FIG. 13 is a shaded logarithmic ISL occupancy map in a conventional global satellite network of FIG. 1; on horizontal axis is hub/satellite number, and the vertical axis is transmitting modem number.

Similarly to the above mentioned case of a continental U.S. satellite network, ISL occupancy of global satellite network was simulated as well, assuming the traffic between the hubs/satellites is proportional to the product of their corresponding connected city populations, shown in FIG. 13. Traffic is routed using ECMP across equal hop count paths, if available.

Prominent periodic oscillation of both the ISL occupancy and total amount of traffic per satellite are the results of satellites cycling in and out of heavily populated areas in the course of their orbits. This results in up to ten orders of magnitude variation of ISL occupancy with all but 40 out of 6336 of their total number being actively involved in the transmission of data traffic.

Figure 14:
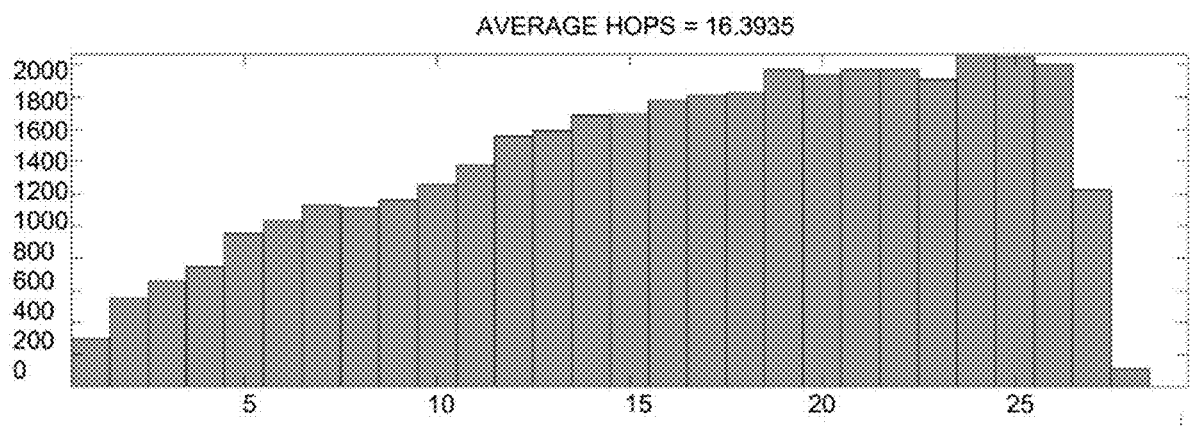
FIG. 14 is a histogram of the distribution of number of hops in the conventional global satellite network of FIG. 1, showing both average number of hops and numerical values of the distribution.

Latency in case of legacy routing by proximity is affected by number of hops from source hub/satellite to destination hub/satellite. Histogram of the distribution of number of hops is in FIG. 14, showing both average number of hops (more than 16) and numerical values of the distribution ranging up to 29 hops.

Proposed Express-Mesh Topology

Figure 15:
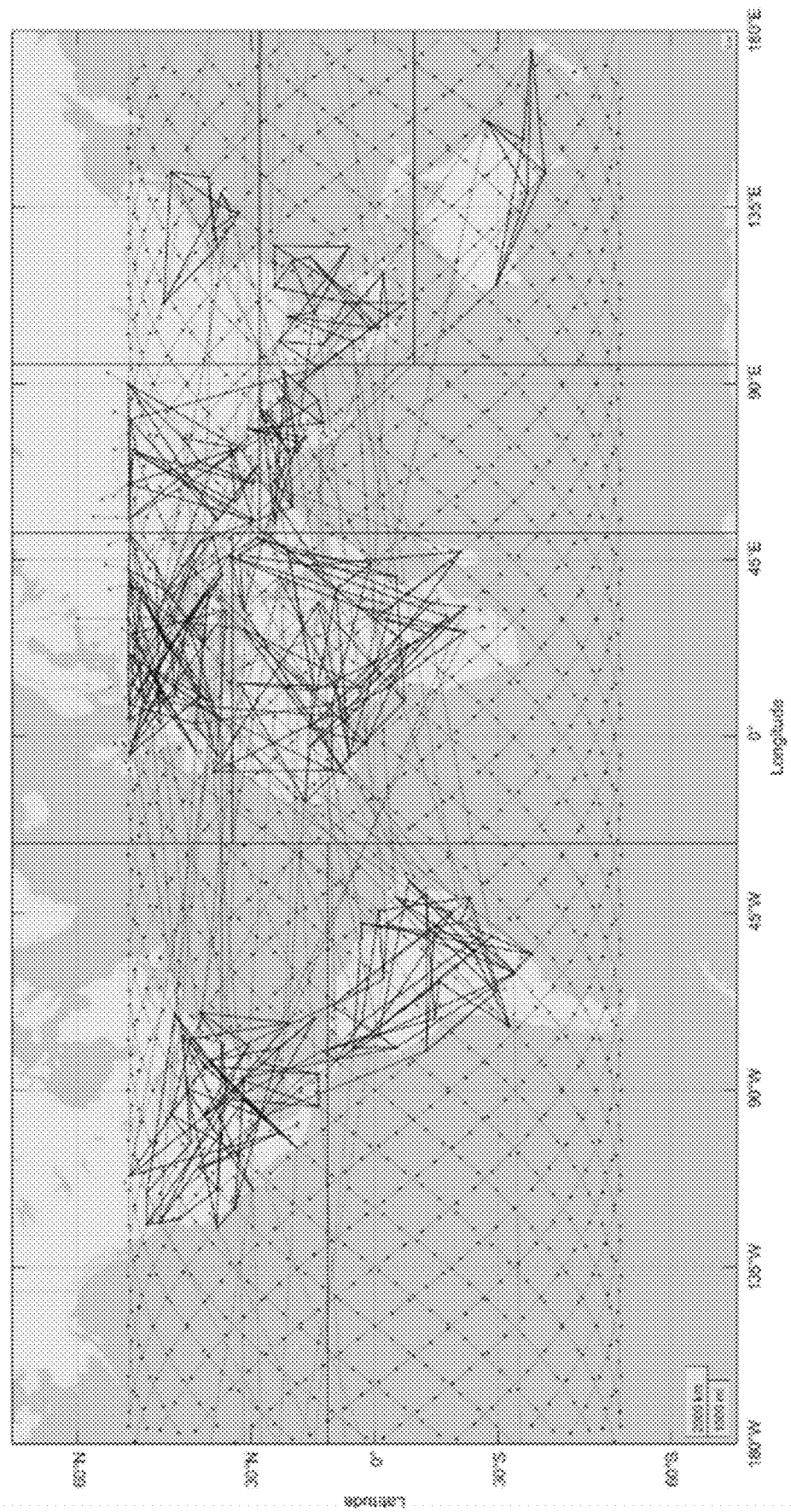
FIG. 15 is a map of the Earth with a global Express-Mesh satellite network over 400 cities with more than 1 million population.

Express-Mesh topology network for global satellite network was designed as compound graph of 9 clusters of different size. The nine separate regional clusters are designated for coverage of Europe, Africa, North America, South America, South-Eastern Asia, Central Asia, India, Far East, and Australia with New Zealand. The clusters are all degree 3 graphs with correspondingly 38, 38, 36, 30, 18, 16, 14, 8, and 6 nodes. This means that 3 out of 4 modems are designated for intra-cluster communication links. The first four clusters have diameter 4, next three clusters have diameter 3 and last two clusters have diameter 2. This amounts to total of 204 hubs/satellites including the Express-Mesh topology with fourth modem designated for inter-cluster communication links, as it is pictured in FIG. 15.

Figure 16:
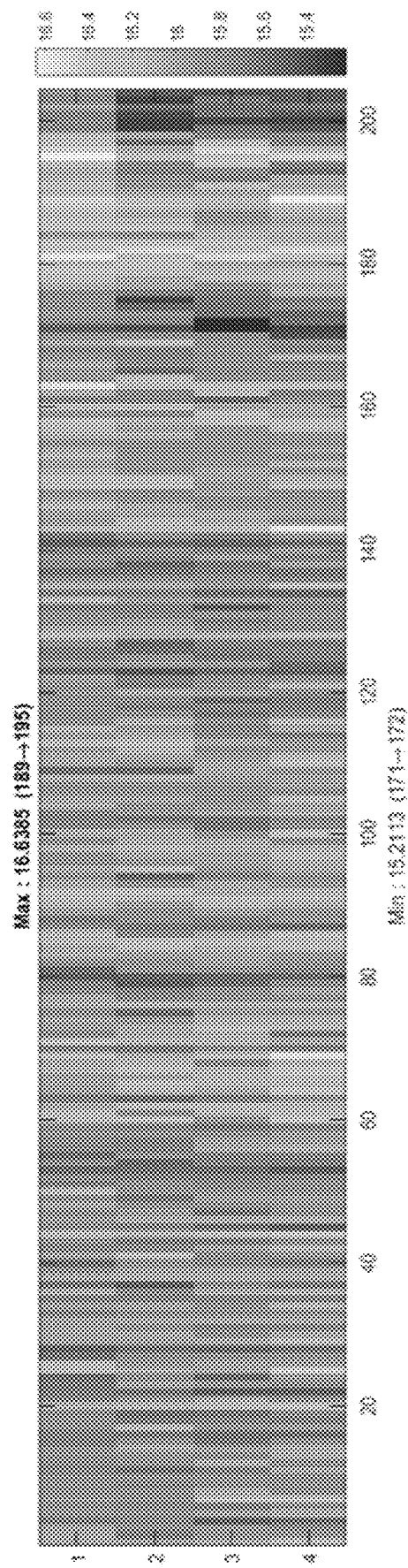
FIG. 16 is a shaded logarithmic ISL occupancy map in the global Express-Mesh satellite network of FIG. 15; on horizontal axis is hub/satellite number, and the vertical axis is transmitting modem number.
Figure 17:
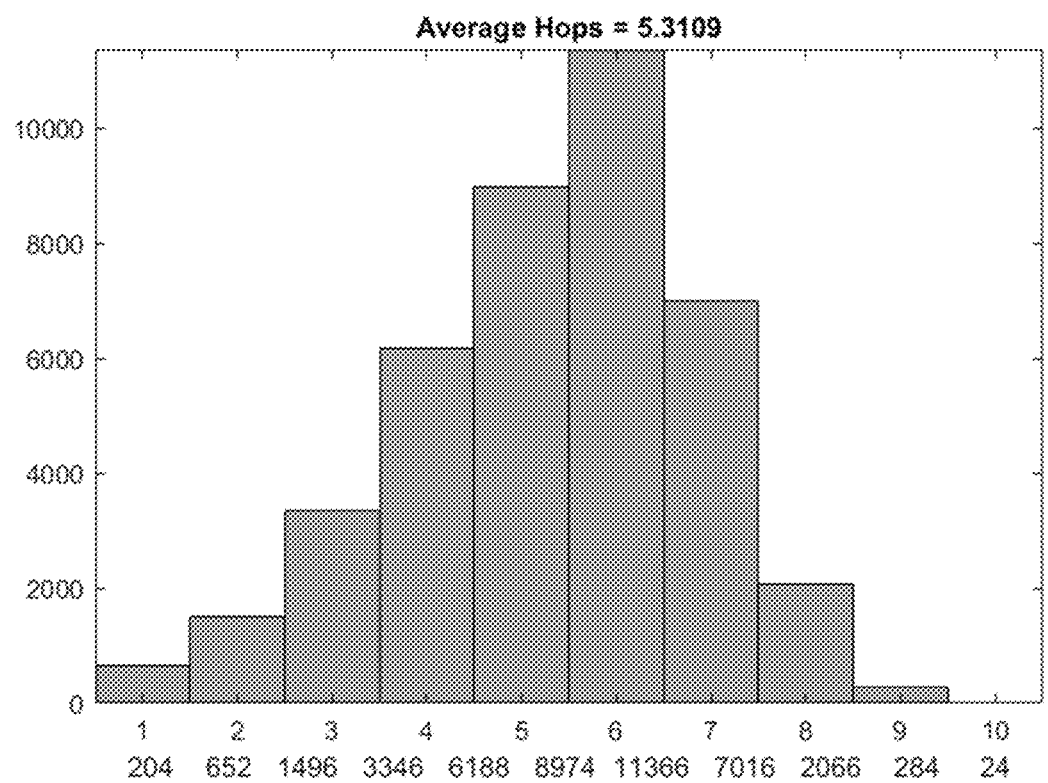
FIG. 17 is a histogram of the distribution of number of hops in the global Express-Mesh satellite network of FIG. 15, showing both average number of hops and numerical values of the distribution.

Simulated ISL occupancy for global Express-Mesh topology satellite network is shown in FIG. 16. ISL occupancy in case of Express-Mesh topology, unlike mesh-grid, spans only one order of magnitude and its maximum value is below that for mesh-grid as well. Average number of hops, including extra hops to bridge the inter-cluster connections, is only 5.3109 and maximum hops is 10, as shown in histogram of the distribution of number of hops is in FIG. 17, showing both average number of hops and numerical values of the distribution.

Finally, statistic metrics for both Mesh-Grid (2D torus) and Express-Mesh topologies are comparatively presented in the Table 2. Note much better performance and power metrics for Express-Mesh topology.

TABLE 2

Comparative metrics for Mesh-Grid and Express-Mesh global satellite networks.

| | Average hops | Maximum hops | Network Load | Average Network Latency | Number of Active Modems |
|---|---|---|---|---|---|
| Mesh-Grid | 16.3935 | 29 | ~30.4 | ~95 | 6296 |
| Express-Mesh | 5.3109 | 10 | ~9.85 | ~52 | 1092 |
| Ratio | 3:1 | 2.9:1 | 3.08:1 | 1.83:1 | 5.8:1 |

Exemplary Optical Network

Figure 18:
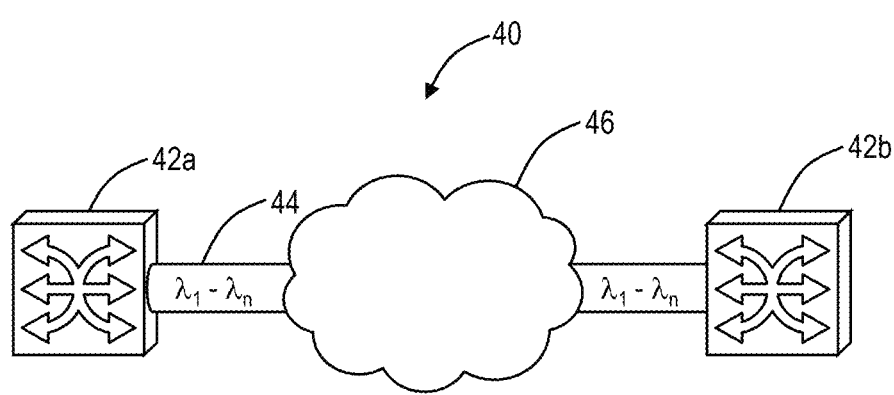
FIG. 18 is a network diagram of an exemplary network implementing a virtual OSA via coherent optical receivers.

Referring to FIG. 18, in an exemplary embodiment, a network diagram illustrates an exemplary network 40 implementing the virtual OSA (Optical Spectrum Analyzer) via coherent optical receivers. The network 40 includes two interconnected network elements 42a, 42b via an optical link 44. Additionally, the optical link 44 can include additional components 46 which are omitted for illustration purposes. For example, the additional components 46 can include, without limitation, optical amplifiers, optical add/drop multiplexers (OADMs), reconfigurable OADMs (ROADMs), etc. In the context of the systems and methods, the network elements 42a, 42b are connected via the optical link 44 which is all-optical between the network elements 42a, 42b, i.e. no optical-electrical-optical (OEO) conversions between the network elements 42a, 42b. The optical link 44 can be a single span or multiple spans with intermediate amplifiers. Those of ordinary skill in the art will recognize that the network 40 can include other network elements 42a, 42b forming various architectures, i.e., mesh, rings, linear, spurs, etc. The network 40 is presented as a single optical link (optionally with the components 46) for an illustration of the systems and methods.

The optical link 44 can include N channels (or wavelengths). For example, the number N can be the maximum supported channels on the optical link 44. Additionally, the number N can be variable with respect to flexible grid channels (e.g., channels taking an arbitrary and variable amount of spectrum). For example, N can be 44 for 100 GHz channel spacing, 88 for 50 GHz channel spacing, or some other combination to deliver between varying number of wavelengths with flexible grid channels. Other embodiments are also contemplated.

Each of the channels can be formed by a transceiver, transponder, optical modem, etc. with either fixed grid or flexible grid spacing. For flexible grid spacing, variable capacity channels typically include adaptable coherent modulation or non-coherent modulation, adaptive FEC schemes, and spectral shaping. A flexible optical modem can support a variable amount of bandwidth, e.g., from x Gbps to y Gbps, where x<y. For example, a flexible optical modem can support a guaranteed rate, e.g. 40 G, 100 G, 400 G, 1 T, etc. along with a higher supported rate, e.g. 40 G→100 G, 100 G→200 G, 400 G→1 T, etc. The flexible optical modem utilizes the adaptable coherent modulation, adaptive FEC schemes, and spectral shaping to support the variable amount of bandwidth. An example of a flexible optical modem is WaveLogic from Ciena Corporation, the assignee of the present application/patent. Also, note the flexible optical modem may also be referred to as a transceiver, transponder, muxponder, etc., i.e., any optical device with a coherent optical receiver.

The virtual OSA contemplated operation via a coherent optical receiver in one of the network elements 42a, 42b, and the coherent optical receiver can be part of an optical modem. In general, an out-of-service coherent optical receiver at one of the network elements 42a, 42b can be used to perform OSA measurements on the optical link 44. The results of the OSA measurements can be used to determine spectral and operating characteristics of the optical link 44, to determine channels in-service and spectrum usage on the optical link 44, to determine an open wavelength or amount of spectrum to use, etc. In an exemplary embodiment, the virtual OSA can be used by the coherent optical receiver to assign a wavelength or amount of spectrum for a corresponding optical transmitter. That is, the coherent optical receiver can use the virtual OSA to determine the operating wavelength or spectrum automatically, without user involvement. Other embodiments are also contemplated.

Optical Transceiver

Figure 19:
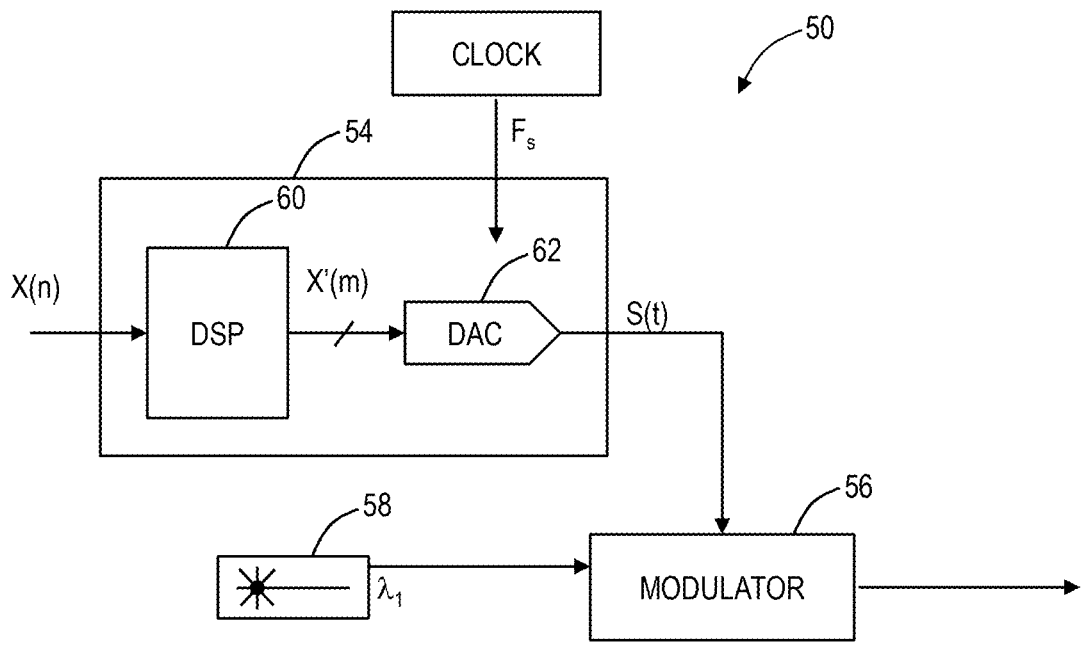
FIG. 19 is a block diagram of a coherent optical transmitter.
Figure 20:
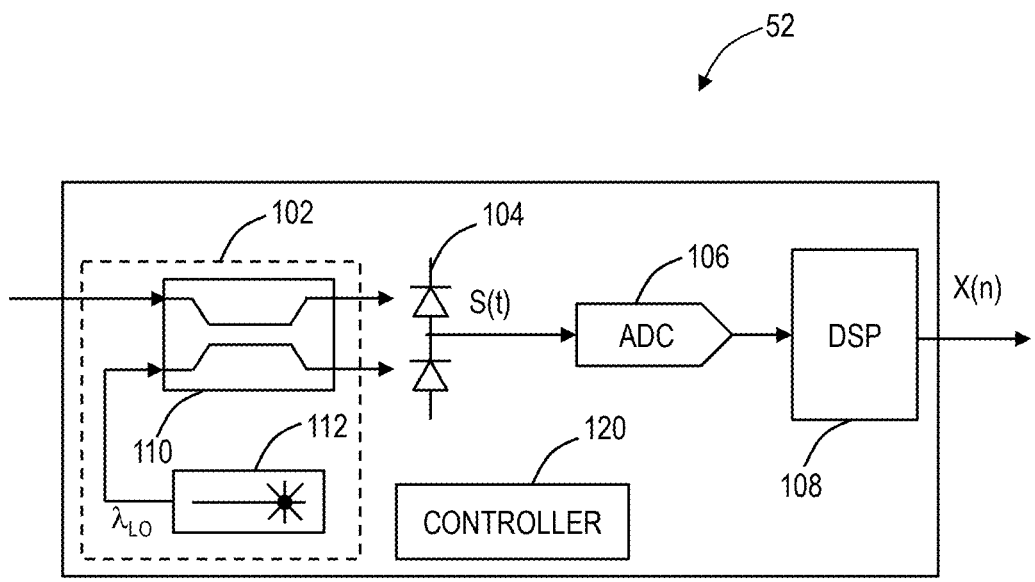
FIG. 20 is a block diagram of a coherent optical receiver, collectively the coherent optical transmitter of FIG. 19 and the coherent optical receiver can form an optical transceiver.

Referring to FIGS. 19 and 20, in an exemplary embodiment, block diagrams illustrate a coherent optical transmitter 50 and a coherent optical receiver 52 which collectively can form an optical transceiver. The coherent optical transmitter 50 and the coherent optical receiver 52 can be located at the network elements 42a, 42b to form a channel over the optical link 44. The coherent optical transmitter 50 typically includes a signal generator 54 for converting a digital signal X(n) to be transmitted into a drive signal S(t) which drives a modulator 56 (e.g., a Mach-Zehnder Modulator (MZM)). The modulator 56 modulates a narrow-band optical carrier, generated by a laser 58 tuned to a predetermined center wavelength $\lambda_1$ (among other center wavelengths $\lambda_2$ to $\lambda_n$), to generate a corresponding optical channel signal. The resultant signal may then be multiplexed by a multiplexer (not shown) into a Wavelength Division Multiplexed (WDM) signal for transmission through the optical link 44 to the coherent optical receiver 52. Typically, the drive signal S(t) is a radio frequency (RF) analog electrical signal. In such cases, the signal generator 54 may include a Digital Signal Processor (DSP) 60 cascaded with a Digital-to-Analog Converter (DAC) 62. The DSP 60 operates to process the digital signal X(n) to generate a corresponding digital drive signal X'(m), which is designed in accordance with the performance and operating requirements of the DAC 62. The DAC 62 operates to convert the digital drive signal X'(m) into the required analog RF drive signal S(t) for modulation onto the optical carrier.

Once through the optical network 40 and the components 46, the optical channel signal is provided to the coherent optical receiver 52. Specifically, the coherent optical receiver 52 can operate in a filterless (or colorless) implementation where all of the WDM signal is present or in a filtered implementation where only a selected channel is present, e.g., wavelength $\lambda_1$. Also, the entire WDM signal (or portion thereof) can be presented to the coherent optical receiver 52 in a filtered implementation using a Wavelength Selective Switch (WSS) or the like. For illustration purposes, the filter components are omitted. In operation as a virtual OSA, the coherent optical receiver 52 would need access to the entire WDM signal (or portion thereof) for OSA measurements, and this can be provided in either a filterless implementation or filtered implementation using the components 46.

The coherent optical receiver 52 includes an optical front end 102 for supplying the optical channel signal to a photodetector block 104, which operates to detect the incoming optical channel signal and generate an electrical photodetector current containing spectral components corresponding to the high-speed signal S(t). The photodetector current is then sampled by an Analog-to-Digital Converter (ADC) 106 and processed by a corresponding DSP 108 in the coherent optical receiver 52 using various digital signal processing techniques to recover the original digital signal X(n). The optical front end 102 is provided by a mixer 110, which combines the incoming optical channel signal with a narrow-band light generated by a local laser 112 tuned to a specific center wavelength, LO, of the optical channel signal. The local laser 112 can be referred to as a Local Oscillator (LO) and may include a tapped portion of the laser 58 from a corresponding optical transmitter 50 located in a same optical transceiver or a separate laser. This arrangement may be used to enable coherent detection of the optical channel signal. However, other arrangements, such as well-known direct detection techniques, may also be used. The coherent optical receiver 52 also includes a controller 120 communicatively coupled to various components for control thereof.

An optical transceiver formed by the coherent optical transmitter 50 and the coherent optical receiver 52 can support various different baud rates through software-programmable modulation formats. The modems can support programmable modulation or constellations with both varying phase and/or amplitude. In an exemplary embodiment, the optical transceiver can support multiple coherent modulation formats such as, for example, i) dual-channel, dual-polarization (DP) binary phase-shift keying (BPSK) for 100 G at submarine distances, ii) DP quadrature phase-shift keying (QPSK) for 100 G at ultra-long haul distances, iii) 16-quadrature amplitude modulation (QAM) for 200 G at metro to regional (600 km) distances), or iv) dual-channel 16QAM for 400 G at metro to regional distances. Thus, in an exemplary embodiment, the same modem can support 100 G to 400 G. With associated digital signal processing (DSP) in the modem hardware, moving from one modulation format to another is completely software-programmable. Other embodiments are also contemplated.

In another exemplary embodiment, the modem can support N-QAM modulation formats with and without dual-channel and dual-polarization where N can even be a non-standard number and not necessarily a standard one like 100, 200, or 400. Here, the modem can support non-standard speeds since N can be a non-standard as opposed to a standard one, i.e., not just 100 G, 200 G, or 400 G, but variable speeds, such as 130 G, 270 G, 560 G, etc. Alternatively, the data rate can be varied by changing the baud rate, such that a given modulation format can carry different capacities based on the baud rate selected. These rates could be integer multiples of 10 Gb/s, or of 1 Gb/s. Furthermore, with the DSP and software programming, the capacity of the flexible optical transceiver can be adjusted upwards or downwards in a hitless manner so as not to affect the guaranteed rate. In other exemplary embodiments, the modem can include hardware which lacks the aforementioned functionality and thus supports a single modulation format/baud rate which cannot be adjusted (but other parameters can be adjusted such as power, spectrum location, etc.). Additionally, the modems can tune and arbitrarily select spectrum; thus, no optical filters are required. Additionally, the modem can support various aspects of nonlinear effect mitigation and dispersion compensation (both for chromatic and polarization mode) in the electrical domain, thus eliminating external dispersion compensation devices, filters, etc. Modems can also adapt the forward error correction coding that is used, as another method to trade-off service rate vs. noise tolerance.

In conventional operation, the local laser 112 is tuned to the predetermined center wavelength $\lambda_1$ of the coherent optical transmitter 52 to allow coherent detection of the optical channel signal. In the virtual OSA operation, the local laser 112 is swept, continuously or in discrete steps, across all or a portion of optical spectrum over the optical fiber 14 to perform coherent detection resulting in an in-skin OSA measurement. The controller 120 can be configured to cause the sweeping of the local laser 112 and the corresponding electrical photodetector current from the photodetector block 104 can be used to generate a spectral plot forming an OSA measurement.

In an exemplary embodiment, the coherent optical receiver 52 is adapted to operate as an OSA. The optical front end 102 is adapted to receive an optical signal and to mix the optical signal with the local laser 112. The photodetector block 104 is coupled to the optical front end 102 and adapted to receive an output of the optical front end 102 and provide an output corresponding to spectral components of the optical signal. The controller 120 is coupled to the optical front end 102 and the photodetector block 104, and the controller 120 is adapted to operate in an OSA mode to sweep the local laser 112 across a portion of the optical spectrum to perform an OSA measurement while not performing data demodulation. The coherent optical receiver 52 can further include the DSP 108 adapted to perform digital signal processing techniques to recover an original digital signal from the optical signal while performing data demodulation.

The controller 120 can be adapted to utilize the OSA measurement to detect automatically existing optical channels to determine available spectrum for use and to cause a corresponding coherent optical transmitter 50 to use a specific wavelength or spectrum based on the available spectrum. The controller 120 can be adapted to utilize the OSA measurement to determine wavelength drift of optical channels in the optical signal. The controller 120 can be adapted to utilize the OSA measurement to determine one or more of a modulation format and baud rate for a corresponding coherent optical transmitter 50. The controller 120 can be adapted to provide the OSA measurement to one or more of a control plane and an external server including any of a Software Defined Networking (SDN) controller, a Network Management System (NMS), and an Element Management System (EMS). The optical signal can include a Wavelength Division Multiplex (WDM) signal with one or more of fixed grid channels and flexible grid channels, provided to the coherent receiver through one of a filtered implementation or filterless implementation. The coherent optical receiver 52 performs the OSA measurement in-skin (i.e., internal to the coherent optical receiver 52) without external test equipment.

The coherent optical receiver 52, by taking advantage of the coherent receiver design, provides in-skin OSA functionality and external test equipment, and operators are no longer needed. Deployment is much easier and safer. Having the in-skin OSA ability allows the optical transceiver to operate more reliably on foreign line systems and allow for safer turn-up and/or restoration of wavelengths in flex grid systems supporting tuning optimization.

The ability for an optical transceiver to pre-determine if it is safe to turn up at the requested frequency can prevent costly outages and provide improved uptimes for operators. It could also reduce the load on system support/engineering teams as less on-site testing and measurement would be required. An optical transceiver could be shipped without fear of miscommunication from the customer causing an unexpected outage. This ability would also allow for easier deployment on foreign line systems were communication with the line system may be limited or non-existent. Accurate spectral information may also allow for even tighter squeezing of channels (i.e., Nyquist or super-Nyquist spacing) without restoration issues allowing for even higher spectral densities. By measuring the spectrum available, channels can optimize their modulation format, and tune both the line and channel capacities using Flexible Ethernet and Flexible Optical Transport Network (OTN).

Figure 21:
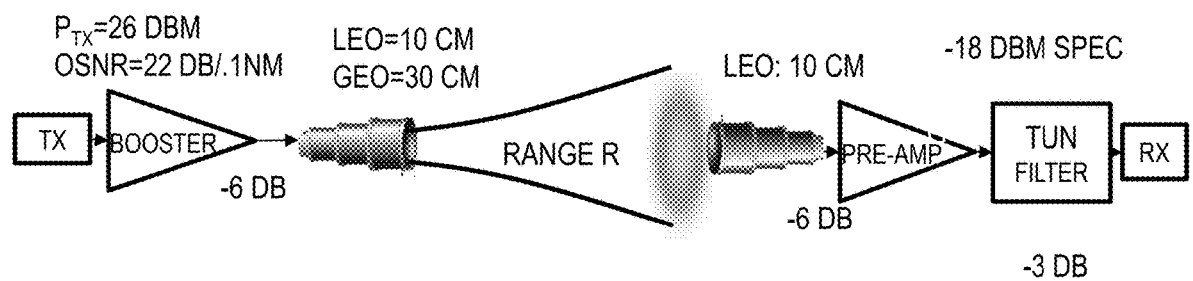
FIG. 21 is a diagram of an optical link in space.

FIG. 21 is a diagram of an optical link in space. Specifically, FIG. 21 illustrates the baseline link and representative subsystem parameters. Typically, an optical link 44 in space includes a transmitter connected to a booster amplifier that connects to a telescope. At the far end, a telescope receives the signal, over the range R, provides the signal to a pre-amplifier which connects to a tunable optical filter and then the receiver. The telescope can include a different diameter, e.g., 10 cm, 30 cm, etc., based on the application. Performance is acceptable with oFEC for DP-QPSK at 2500 and 5000 km and DPSK at 45000 km.

The following table includes example configuration values.

|  | LEO 100 Gb/ 2500 km | LEO 25 Gb/ 5000 km | GEO 1 Gb/ 45000 km |
|---|---|---|---|
| $P_{boost}$ (dBm) | 26 | 26 | 26 |
| Free Space Loss (dB) | −53.9 | −59.9 | −79 |
| $P_{rx}$ into pre-amp (dBm) | −39.9 | −45.9 | −65 |
| G for pre-amp to get −18 dBm (dB) | 21.2 | 27.9 | 37.5 |
| OSNR (dual-pol ASE, dB/.1 nm) | 12.6 | 6.98 | −2.5 |
| Full-band 'flat' ASE power at −18 dBm signal (dBm) | −5 | 0.5 | 10 |

Doppler Frequency Shift

Coherent optical communications between LEO satellites are subject to Doppler shift of laser wavelength (or frequency). This phenomenon is exhibited most prominently when communicating satellites are propagating in counter-rotating circular orbits with small angles between their orbit planes. In this scenario satellites are first approaching and then moving apart from each other at almost double the first cosmic velocity (orbital velocity), resulting in up to ±10 GHz Doppler frequency shift at 1550 nm.

Figure 22:
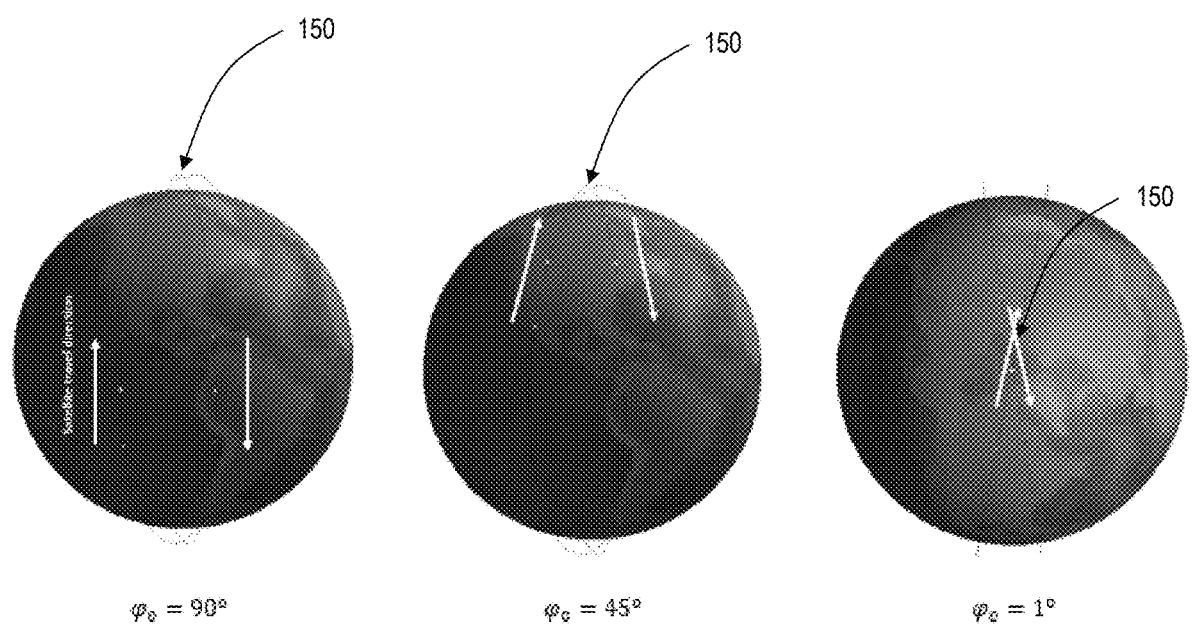
FIG. 22 is a diagram showing satellite orbit crossing points.

These scenarios can be described, analyzed, and visualized using just two parameters: azimuthal angle (ΔΘ) between orbital planes, and polar angle ($\phi_o$) at which both satellites are angularly equidistant from the orbital intersection point. FIG. 22 is a diagram showing satellite crossing points where the polar angle indicates how far the satellites are from the orbit crossing point 150.

Embodiments of the present disclosure detect, and provide safeguards against the singularity when both satellites simultaneously arrive close to the orbital crossing point 150. This singularity occurs because the satellites are moving past one another at nearly double the first cosmic velocity, and maintaining communication telescope alignment requires very rapid pivoting of one satellite with respect to the other at very short distance. This results in an extreme peaking of slew rates of Doppler shift and azimuth angle of beam forming telescope alignment. With excessive slew rates being successfully safeguarded, the present disclosure provides systems and methods for Doppler shift compensation involving a combined contribution of both Laser Oscillator (LO) and Transmitter (TX) lasers for doubling the Doppler shift compensation range afforded by a single laser.

Standard LEO satellite constellations are generally sparse and usually co-propagating in orbits with inclination of about 53 degrees, and do not experience excessive peaking of slew rates nor extreme Doppler shift due to much smaller relative velocity. Newer LEO constellations are much denser with thousands of satellites in orbits with potentially small azimuthal angles. This leads to the need to improve Doppler compensation range.

The line of sight distance between two counter-propagating satellites is an important basic factor in the following analysis. The dependence of line of sight distance D between two satellites on orbits with radius R from polar angular position φ of the ascending TX satellite can be easily expressed in terms of the two above mentioned parameters:

$$D = \sqrt{\left(2R\cos\left(\frac{\Delta\Theta}{2}\right)\sin(\phi - \phi_o)\right)^2 + D_{min}^2}$$

$$D_{min} = 2R\sin(\phi_o)\sin\left(\frac{\Delta\theta}{2}\right)$$

Figure 23:
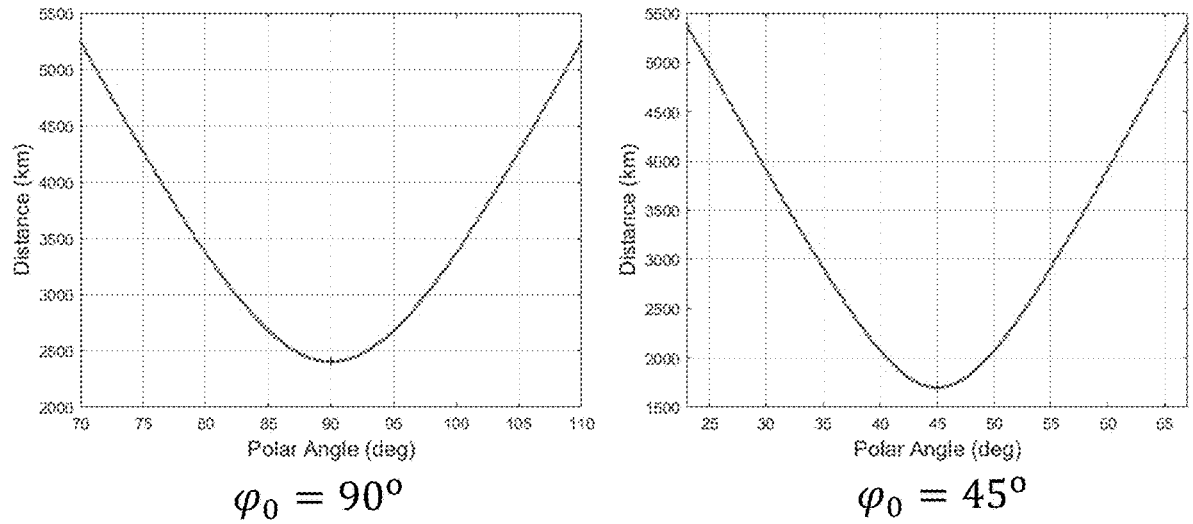
FIG. 23 shows a plurality of graphs representing calculated distance plotted versus polar angular position of ascending TX satellite within the line of sight range for various values of polar angle at minimum separation.
Figure 23:
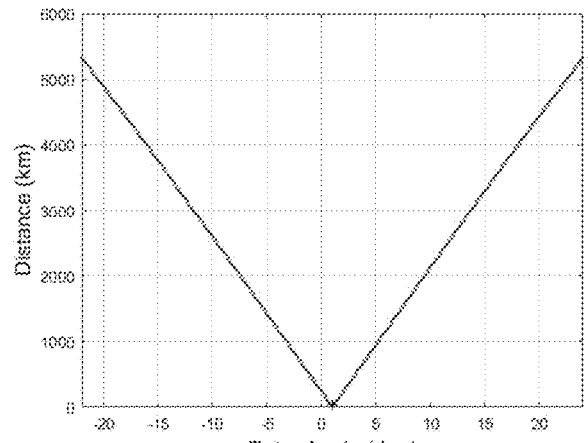

$D_{min}$ is the minimum distance between satellites when they are equidistant from their orbit's crossing point. FIG. 23 shows a plurality of graphs representing calculated distance plotted versus polar angular position of ascending TX satellite within the line of sight range for various values of polar angle. The relative distance between satellites is shown for three different scenarios of counter-propagating LEO satellites in two polar orbits.

It is evident from both the formulae and the plots, that satellites are closest to each other when equidistant from the crossing, having a "close encounter" of sorts. The closer equidistant point to the crossing and the smaller the azimuthal angle between the orbital planes, the smaller the minimum distance of the close encounter $D_{min}$. The importance of $D_{min}$ is in the fact that satellites optical link telescopes are pivoting with respect to each other at this $D_{min}$ when they are equidistant. This situation becomes very dynamic at the distance of the close encounter, causing extreme increase of both slew rates of Doppler shift and azimuth angle of the pointing telescope.

The speed with which satellites move with respect to one another plays a singular and fundamental role in the Doppler effect. This relative velocity can become as high as almost double the orbital velocity, causing the most severe Doppler effect. The dependence of relative velocity from polar angular position of the TX satellite can also be expressed in terms of the above two parameters:

$$V = \frac{2 R V_o \cos^2\left(\frac{\Delta\Theta}{2}\right) \sin(2(\phi - \phi_o))}{D}$$

$V_o$ is orbital velocity.

Figure 24:
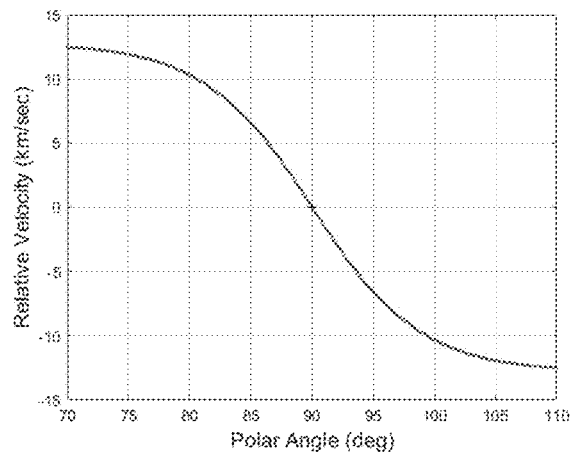
FIG. 24 shows a plurality of graphs representing calculated relative velocity plotted versus angular position of an ascending TX satellite within the line of sight range for benchmark values of polar angle at minimum separation.
Figure 24:
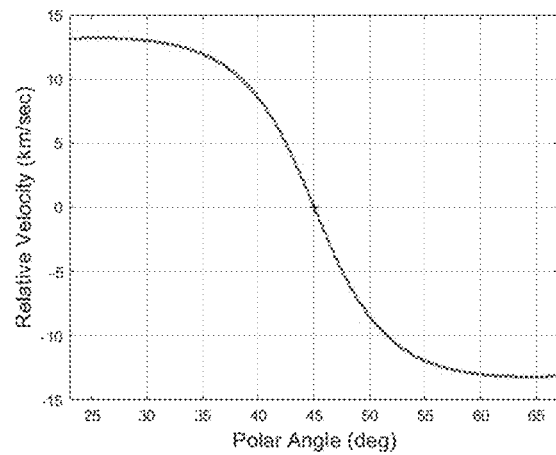
Figure 24:
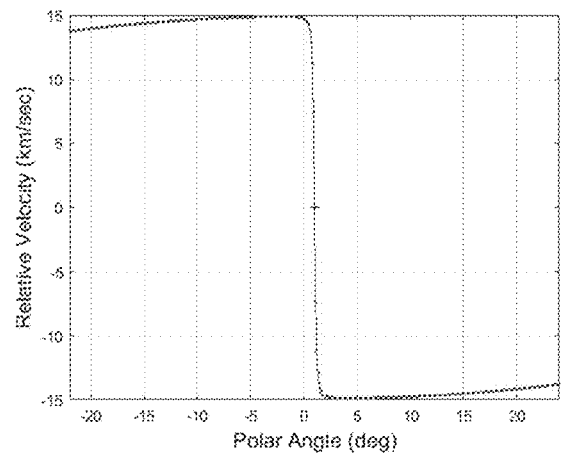

FIG. 24 shows a plurality of graphs representing calculated relative velocity plotted versus angular position of an ascending TX satellite within the line of sight range for benchmark values of polar angle. Specifically, the relative velocity of two satellites for three different scenarios of counter-propagating LEO satellites in two polar orbits is shown.

It is evident from both the formula and the plots, that relative velocity can approach double of the orbital velocity which is equal to 7.5852 km/s for satellites orbiting at 550 kilometers above Earth. It is also seen that relative velocity equals zero at the equidistant point, where satellites switch from approaching to separating. The region around the equidistant point of a close encounter where this switching from approaching to separating takes pace becomes narrower and narrower, and relative velocity drops steeper and steeper as equidistant point gets closer to the crossing (i.e., polar angle gets closer to 0). This observed behavior of relative velocity is essential for the behavior of the Doppler shift it causes.

Figure 25:
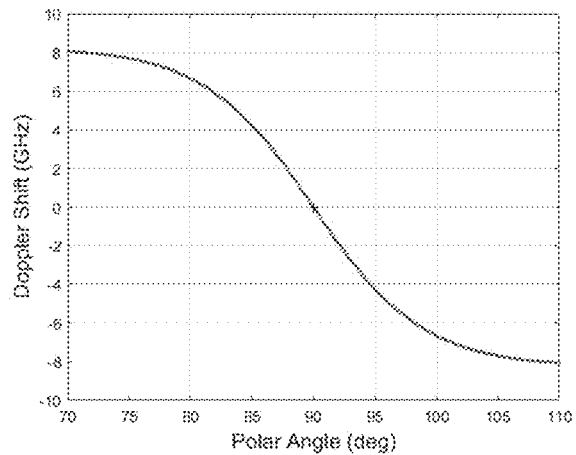
FIG. 25 shows a plurality of graphs representing Doppler shift for three different scenarios of counter-propagating LEO satellites in two polar orbits.
Figure 25:
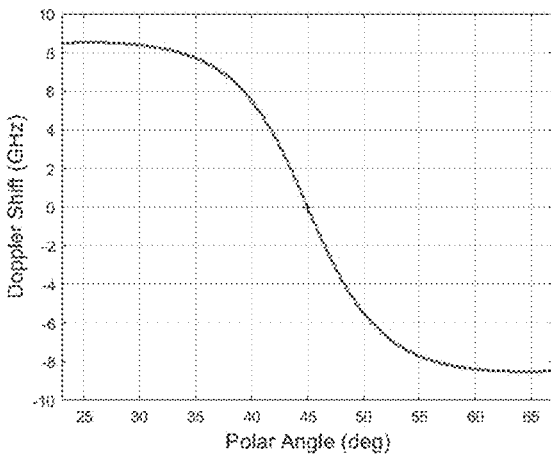
Figure 25:
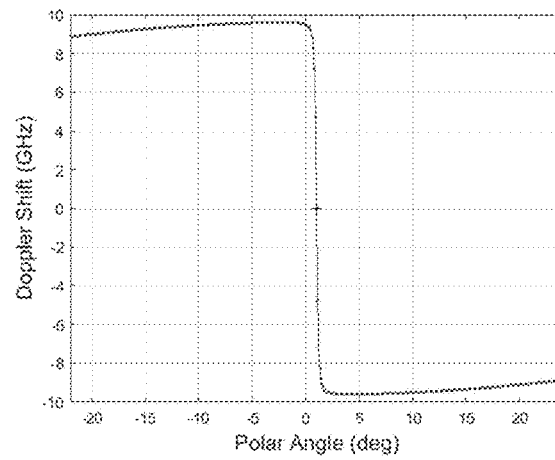

Doppler shift is equal to the relative velocity divided by wavelength (λ). As such, it exactly mimics the relative velocity as shown in FIG. 25 to vary between up to +/−10 GHz at 1550 nm and equals zero at equidistant point for all three benchmark values of polar angle. FIG. 25 shows a plurality of graphs representing Doppler shift for three different scenarios of counter-propagating LEO satellites in two polar orbits. Since the onset of optical communication occurs after satellites enter the line of sight range, while approaching each other, and ceases before they exit, while separating, Doppler shift starts as "blue shift" and ends as "red shift." Similarly, to the relative velocity, at the region around equidistant point of a close encounter, Doppler shift changes faster and faster as equidistant point gets closer to the crossing (i.e., polar angle gets closer to 0).

Doppler slew rate is essentially a time derivative of Doppler shift, and is expressed as follows:

$$-\frac{16 R^2 V_o^2 \cos^2\left(\frac{\Delta\Theta}{2}\right)}{D^3 \lambda} \left( \cos(2(\phi - \phi_o)) \sin^2(\phi_o) \sin^2\left(\frac{\Delta\Theta}{2}\right) - \sin^4(\phi - \phi_o) \cos^2\left(\frac{\Delta\Theta}{2}\right) \right)$$

Figure 26:
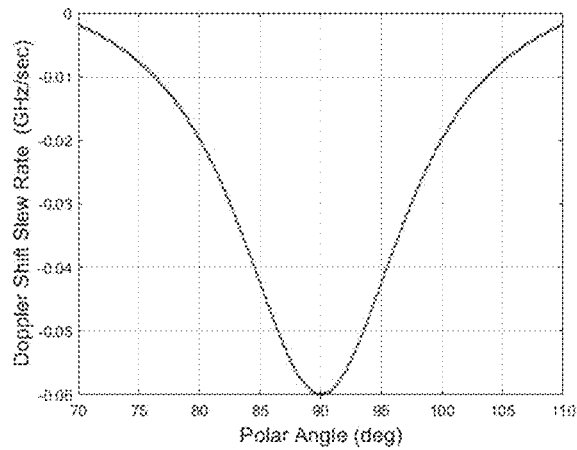
FIG. 26 shows a plurality of graphs representing Doppler slew rate for the three different scenarios of counter-propagating LEO satellites in two polar orbits.
Figure 26:
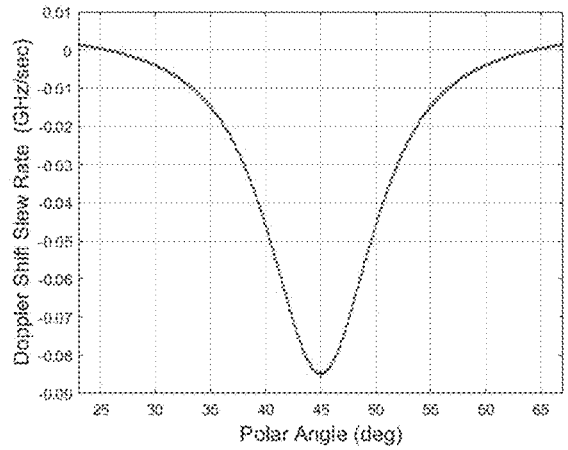
Figure 26:
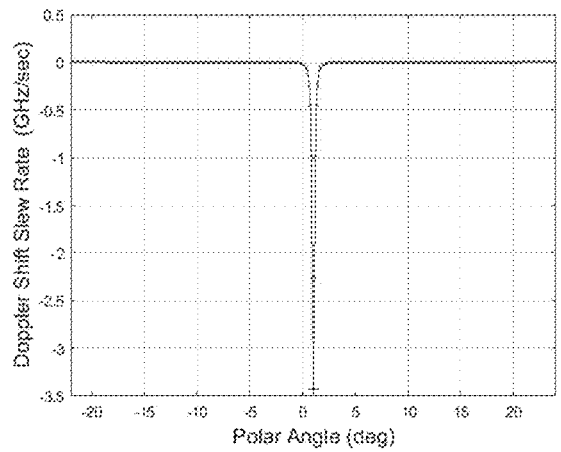

Doppler slew rate as a time derivative of Doppler Shift reflects the decreasing evolution of Doppler shift itself, and its fast drop at around the equidistant point by being negative and peaking in the region around equidistant point of the close encounter. FIG. 26 shows a plurality of graphs representing Doppler slew rate for the three different scenarios of counter-propagating LEO satellites in two polar orbits. The peak value of Doppler slew rate is calculated to be:

$$-2 \frac{V_o^2 \cos^2\left(\frac{\Delta\Theta}{2}\right)}{R \lambda \sin(\phi_o) \sin\left(\frac{\Delta\Theta}{2}\right)}$$

Another important parameter of intersatellite optical communication system which changes dynamically when two counter-propagating satellites are moving past each other, is pointing telescope azimuth angle. Maintaining line of sight "visual" contact requires that beam forming telescopes are pointed at each other at all times, and in case of a close encounter, would have to swing fastest to do exactly that. The dependence of pointing telescope azimuth angle from polar angular position of the TX satellite can be easily expressed in terms of two above mentioned parameters:

$$\theta = \operatorname{atan}\left( \frac{\sin(\phi) + \sin(\phi - 2\phi_o)}{\sin(\phi - 2\phi_o) \sin(\Delta\Theta)} - \tan\left(\frac{\Delta\Theta}{2}\right) \right)$$

Figure 27:
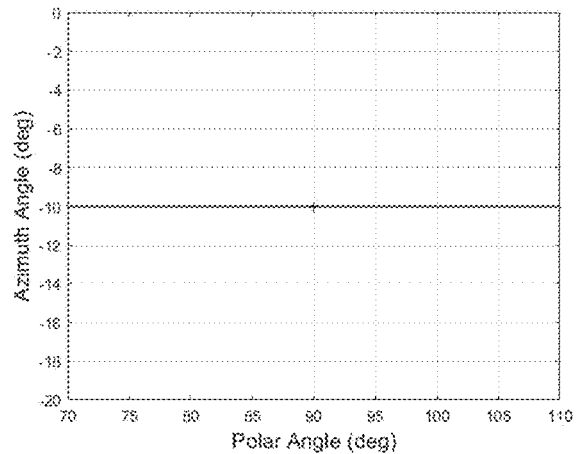
FIG. 27 shows a plurality of graphs representing pointing telescope azimuth angle for three scenarios of counter-propagating LEO satellites in two polar orbits.
Figure 27:
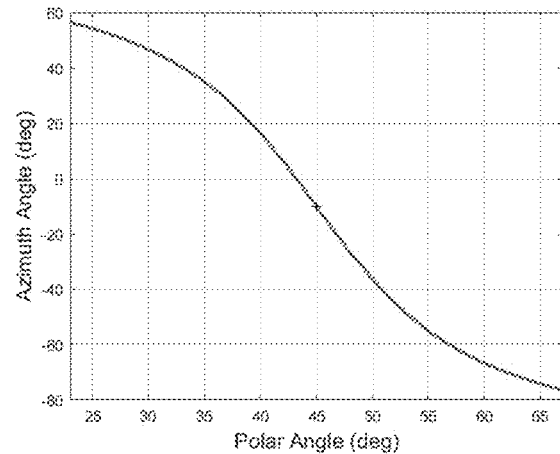
Figure 27:
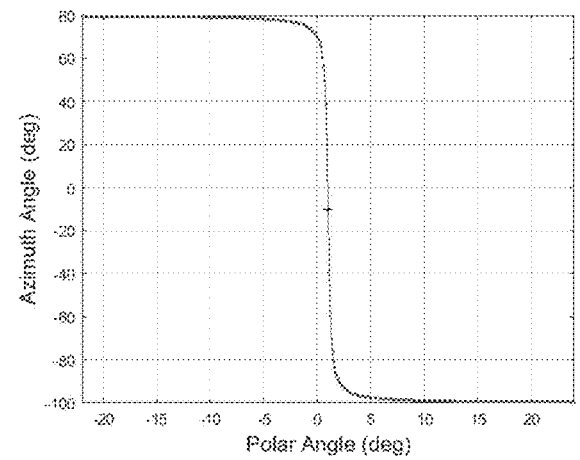

In FIG. 27, calculated pointing telescope azimuth angle is shown plotted versus polar angular position of ascending TX satellite within the line of sight range for the three benchmark values of polar angle. It is evident from both the formulae and the plots, that azimuth angle equals −ΔΘ/2 at the equidistant point of a close encounter when polar angular position equals the polar angle. Moreover, when equidistant point of a close encounter is on the equator (polar angle=90), azimuth angle stays flat at this same value due to symmetrical positions of two satellites with respect to equatorial plane. Finally, similarly to the dynamics of Doppler shift, at the region around the equidistant point of the close encounter the steepness of the azimuth angle curve becomes higher and higher as the equidistant point of the close encounter gets closer to the pole.

Figure 28:
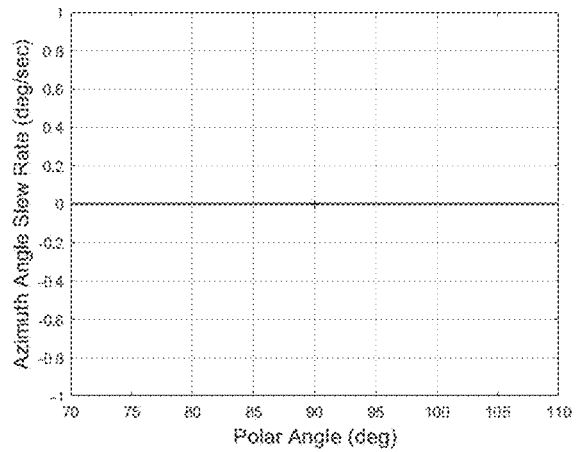
FIG. 28 shows a plurality of graphs representing azimuth angle slew rate for the different scenarios of counter-propagating LEO satellites in two polar orbits.
Figure 28:
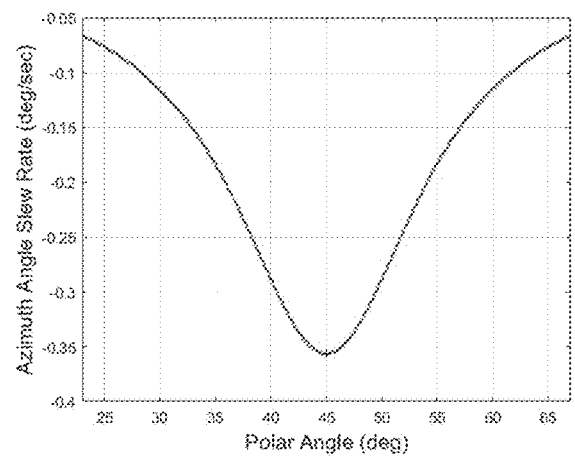
Figure 28:
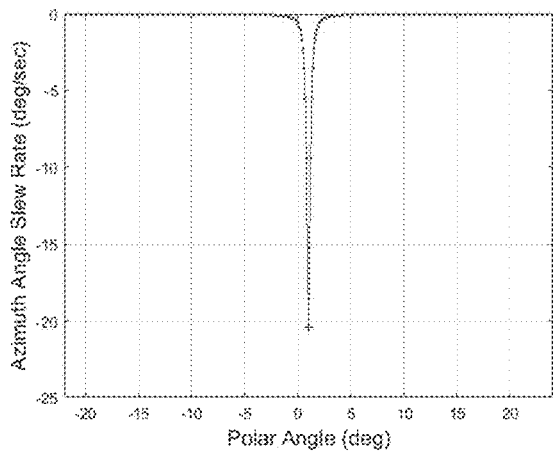

Slew rate of azimuth angle, being a time derivative of azimuth angle proper, so its dependence from polar angular position of ascending TX satellite can be expressed in degrees per second as follows:

$$-\frac{360°}{T_o} \frac{\cos^2(\theta) \sin(2\phi_o)}{\sin(\Delta\Theta) \sin(\phi - 2\phi_o)}$$

where θ is azimuth angle and $T_o$ is orbital period, while the benchmark parameters are as before. FIG. 28 shows a plurality of graphs representing azimuth angle slew rate for the different scenarios of counter-propagating LEO satellites in two polar orbits. Calculated azimuth angle slew rate is shown plotted versus polar angular position of ascending TX satellite within the line of sight range for the benchmark values of polar angles.

It follows from both formula and plots, as well as the behavior exhibited by azimuth angle itself, that azimuth angle slew rate is firmly zero for an equatorial position of the equidistant point of a close encounter, just as Azimuth Angle itself stays constant and equal to −ΔΘ/2. As the equidistant point deviates from the equatorial plane, and moves toward the pole, the azimuth angle slew rate starts peaking as azimuth angle exhibits increasing slope at the region around the equidistant point of the close encounter, with the slope getting steeper and azimuth angle slew rate peaking more with the equidistant point approaching orbital crossing. The peak value of azimuth angle slew rate is calculated to be:

$$-\frac{360°}{T_o \tan(\phi_o) \tan\left(\frac{\Delta\Theta}{2}\right)}$$

Figure 29:
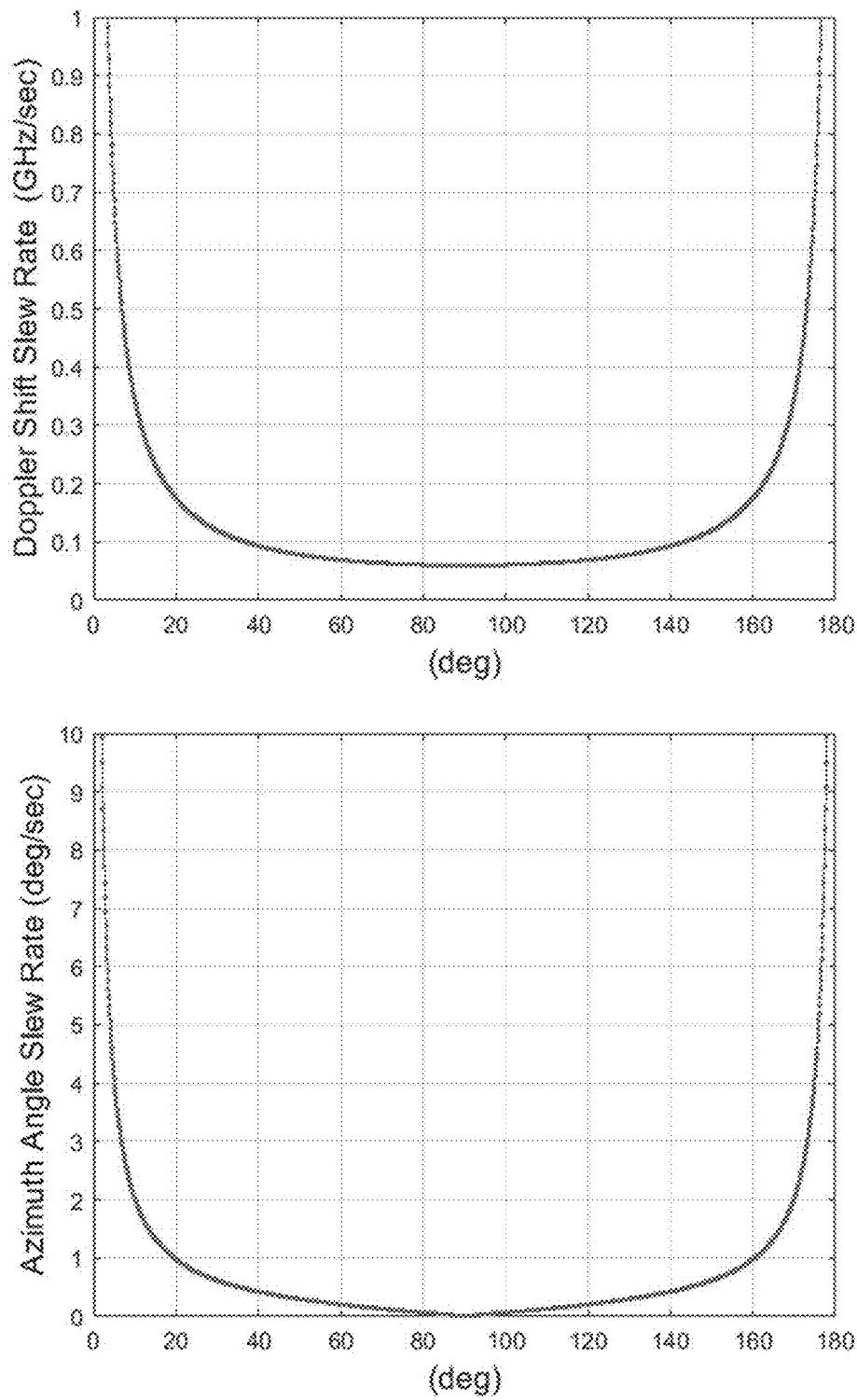
FIG. 29 shows maximum absolute values of Doppler and azimuth angle slew rates for polar angular positions of equidistant point.

Both Doppler shift and azimuth angle slew rates demonstrate severe peaking behavior when the equidistant point approaches orbital crossing. To summarize and generalize the peaking behavior of both Doppler and azimuth angle slew rates, the maximum absolute value of both was calculated for polar angular position of equidistant point ranging from around 0 degrees to around 180 degrees using the above formulae and are shown in FIG. 29. This is because Doppler slew rate peak is always negative, and azimuth angle slew rate peaks are changing sign from northern to southern hemisphere. FIG. 29 shows maximum absolute values of Doppler and azimuth angle slew rates for polar angular positions of equidistant point.

The plots indicate the singularity at the orbital crossing, leading to unlimited peaking of both slew rates. They also, with assistance of the formulae, allow to detect the range around the crossing within which slew rates might exceed the specified capabilities of processing and control systems responsible for Doppler shift compensation and adjustment of pointing telescope azimuth angle to function properly. As a result, proper procedures to avoid and counteract the extreme conditions related to Doppler shift and azimuth angle can and must be addressed.

Doppler Frequency Shift Compensation

The present disclosure provides systems and methods to resolve two kinds of extremes. The extremes include maximum Doppler shift and extreme peaking of Doppler Slew Rate and Azimuth Angle Stew Rate. Analyzed behavior of both Doppler slew rate and azimuth angle slew rate shows that they can peak extremely highly when both communicating satellites are approaching the orbital crossing point 150. The extreme peaking of slew rates at the orbital crossing due to the singularity related to extremely close encounter between counter-propagating satellites ensures that they can overwhelm any capabilities of either Doppler shift compensating or azimuth angle adjusting mechanisms. Fortunately, the precision of mechanics of orbital motion and exact predictive knowledge of related dynamics of both Doppler shift and azimuth angle and their slew rates allows to predict the onset of these extreme situations. This allows to additionally avoid them by re-arranging the intersatellite connection endangered by the looming onset of extreme slew rate to the safe one by simply switching to the next satellite either ahead or behind of the current one, thus avoiding the chance of both communicating satellites getting dangerously close to the orbital crossing point 150.

Doppler shift compensation is accomplished by a corresponding separation of TX and LO laser frequencies. Conventionally, only LO participates in frequency tracking. However, Doppler shift experienced in dense satellite constellations can exceed the continuous fine-tuning frequency range of a single laser. The present disclosure provides a mechanism by which Doppler compensation range can be extended involving tuning of both TX and LO lasers. This requires shifting the frequency of TX laser in the opposite direction to that of LO, allowing to compensate up to double laser tuning ranges worth of Doppler shift. The tuning of the TX and LO lasers being performed by temperature, laser cavity control, modulators or other devices known to one of skill in the art.

Precision of mechanics of orbital motion and measurements of satellite attitudes (i.e., orientation within an orbit) allow quite accurate prediction of telescope pointing and Doppler shift and their dynamics. These greatly contribute to the efficiency of Doppler Shift compensation. Similarly, based on the deterministic nature of Doppler shift evolution, the amount of Doppler shift compensation can be predicted simply by extrapolation. Both predictive knowledge of orbital computations and simple prediction by extrapolation can complement and benefit any of the compensation procedures described herein.

Commercial lasers used for coherent transceivers generally follow Integrated Tunable Laser Assembly (ITLA) specification standardized within Optical Internetworking Forum (OIF). These are tunable lasers that have two separate controls as described herein. One for setting coarse, discrete operating frequency (Laser_Channel), and one for achieving continuous tuning around that set point (Fine_Tune_GHz). Typical grid spacing may be 50 GHz, 25 GHz, or 12.5 GHz. Typical fine-tuning range could be between +/−5 GHz to +/−9 GHz. Laser frequency in GHz can be defined as:

(Laser_Channel−1)*Grid_Spacing_GHz+First_Channel_Frequency_GHz+Fine_Tune_GHz.

Figure 30A:
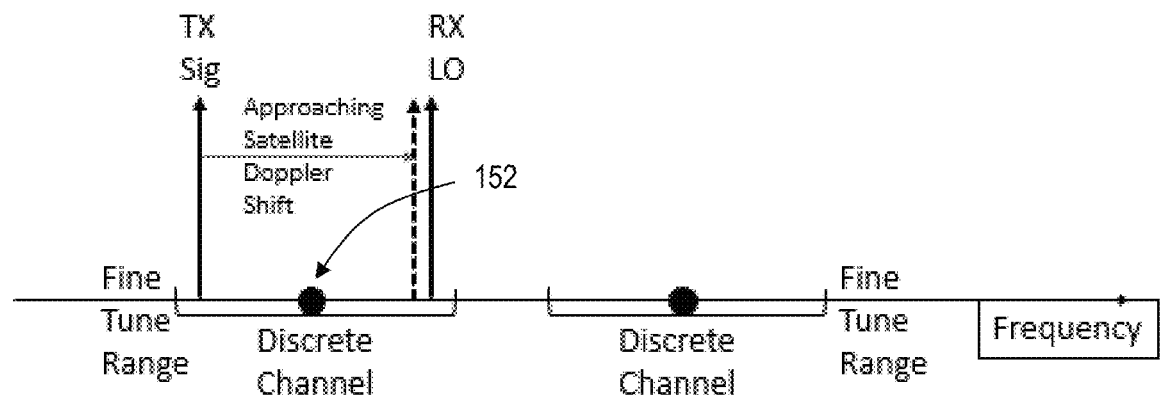
FIG. 30A-FIG. 30C are illustrations of Doppler compensation frequency tuning.
Figure 30B:
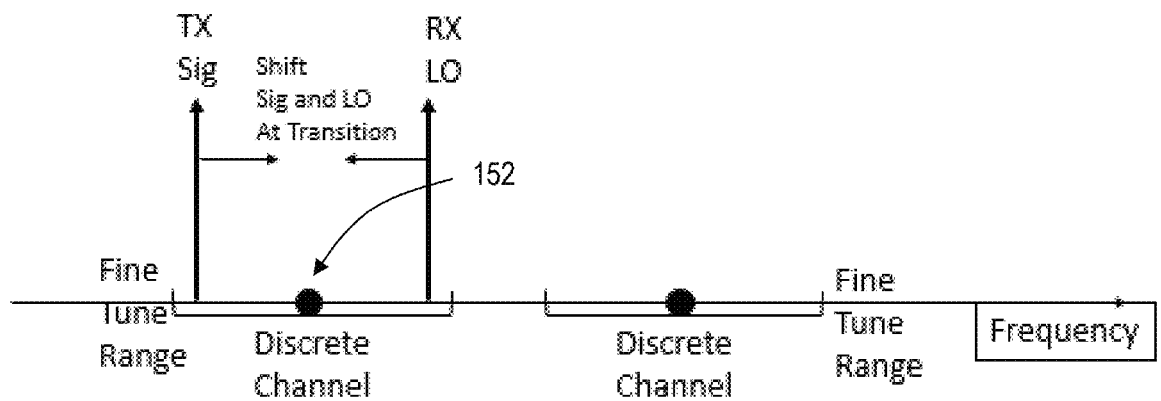
Figure 30C:
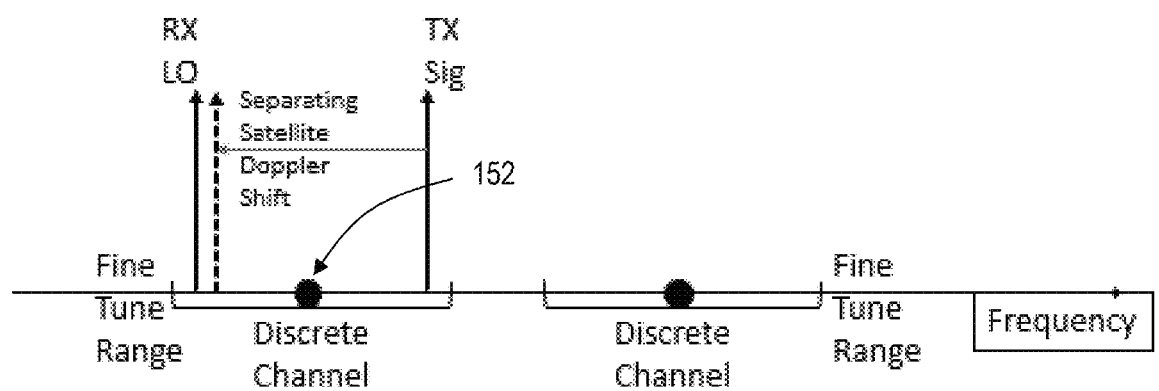

FIG. 30A-FIG. 30C are illustrations of Doppler compensation frequency tuning, where FIG. 30A represents far-separated, approaching satellites, FIG. 30B represents satellites near equidistant point of close encounter, and FIG. 30C represents far-separated, moving apart satellites. Typical values for Grid_Spacing_GHz may be 25 GHz, and a range for Fine_Tune_GHz may be ±5 GHz. Satellites will have a pre-arranged discrete channel defined for a particular communication link and direction. Note that both directions of same link will generally have large separation between pre-arranged discrete channels to improve optical isolation.

There are several scenarios of how TX and LO lasers can collaborate on the task of Doppler shift compensation. One scenario being, if maximum Doppler shift does not exceed the maximum frequency tuning range of LO, LO itself and alone can be tasked with Doppler shift compensation. In this scenario time varying Doppler shift can be treated just like moderate frequency drift of TX laser, with standard procedures of its compensation being perfectly applicable in this scenario, TX laser being fixed near discrete channel center frequency. Another scenario includes, if maximum Doppler shift does exceed the laser maximum frequency tuning range, but still less than twice, then LO and TX laser start sharing the task of Doppler shift compensation, by shifting their frequencies equally, but in opposite directions.

Normally, as if there was no Doppler shift to compensate, both TX and LO lasers would end up somewhere within the same oversized dot 152 representing discrete channel in FIG. 30A-FIG. 30C (the dot 152 is oversized to indicate the residual uncertainty of laser tuning). Right after satellites enter the line of sight range, they are approaching each other with high relative velocity, and experience high positive Doppler shift. To compensate the positive or "blue" Doppler shift, both TX and LO lasers are tuned (TX laser frequency is decreased, and LO laser frequency is increased) by the amount equal to the half of the prescribed (by orbital computations) amount of Doppler shift to be compensated. This is illustrated by solid arrows representing their frequencies in FIG. 30A. Doppler up-shifted TX laser line is shown as dashed arrow, positioned next to the LO laser line within the residual laser tuning uncertainty. This residual laser de-tuning being successfully compensated by receiver-side Digital Signal Processor (DSP). As satellites near the equidistant point of close encounter, TX and LO laser lines are getting close to their common Discrete Channel, because their relative velocity and Doppler Shift decreases down to zero, which is represented in FIG. 30B. Just as satellites are to leave the line of sight range, they are separating from each other with high relative velocity, and experience high negative Doppler shift. To compensate this negative or "red" Doppler shift, both TX and LO lasers are tuned (TX laser frequency is increased, and LO laser frequency is decreased) by the amount equal to the half of the prescribed (by orbital computations) amount of Doppler Shift to be compensated. This is illustrated by solid arrows representing their frequencies in FIG. 30C. Doppler down-shifted TX laser line is shown as dashed arrow, positioned next to the LO laser line within the residual laser tuning uncertainty. This residual laser de-tuning being successfully compensated by receiver-side DSP.

There may be cases when orbital computations are not available to the Doppler compensation algorithms. In this case the present systems and methods can make use of the symmetric property of the bidirectional optical link, even though specific discrete channels for two directions are different. If satellites are approaching each other, TX frequency is initially set to near lowest edge of fine-tuning range for both satellites. Similarly, if satellites are moving apart from each other, TX frequency is initially set to near highest edge of fine-tuning range for both satellites. LO setting is then determined by the receiver-side DSP. Once known on both sides, both TX and LO are shifted to effectively recenter their position roughly symmetrically around the discrete frequency to maximize allowed future tuning range.

As satellites continue to move relative to each other, frequency correction feedback is split equally between TX and LO lasers. Since both satellites produce these updates asynchronously, it is possible that some residual frequency errors will occur. However, fastest Doppler slew rate will be limited both by laser fine tuning speed to <300 MHz/s, which occurs for satellites with smallest separation. A separation of <300 km produces a latency of 1 ms, which corresponds to a potential frequency error of only 0.3 MHz. Internal coherent DSP algorithms can easily handle dynamic compensation of small residual frequency errors.

Doppler Frequency Shift Compensation Process

Figure 31:
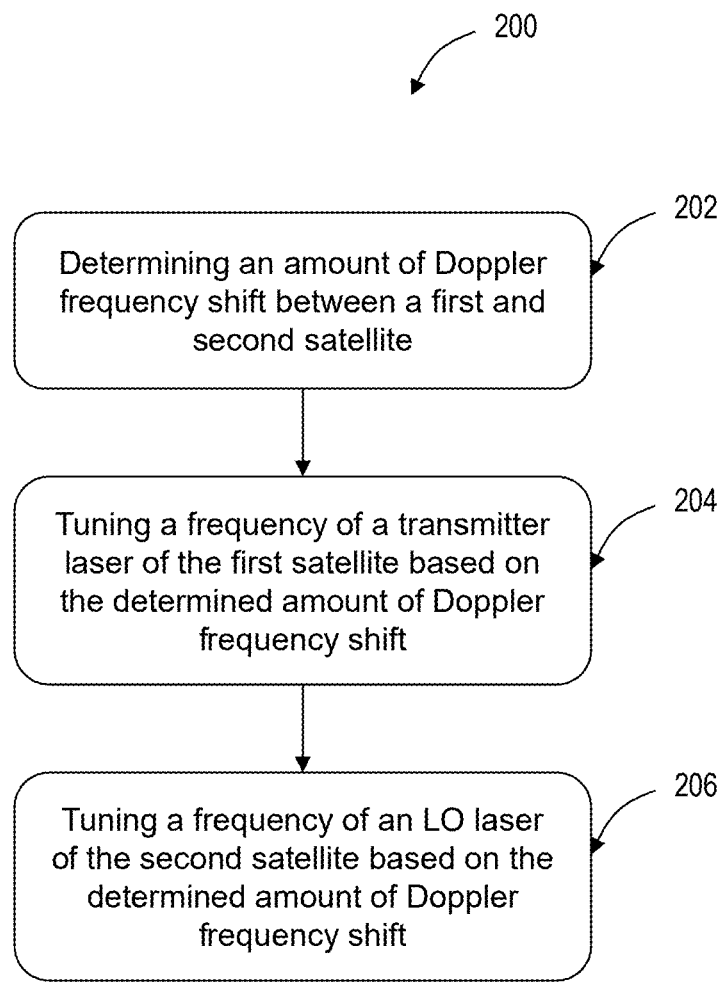
FIG. 31 is a flow chart of a process for compensating Doppler shift in satellites.

FIG. 31 is a flow chart of a process 200 for compensating Doppler frequency shift in satellites. The process 200 includes determining an amount of Doppler frequency shift between a first and second satellite (step 202). A frequency of a transmitter laser of the first satellite is tuned based on the determined amount of Doppler frequency shift (step 204). Additionally, a frequency of an LO laser of the second satellite is tuned based on the determined amount of Doppler frequency shift (step 206). The transmitter laser and the LO laser can be tuned in opposite directions. The transmitter laser frequency is decreased in the first satellite and the LO laser frequency is increased in the second satellite by an amount equal to half of the amount of positive Doppler frequency shift to be compensated. The transmitter laser frequency is increased in the first satellite and the LO laser frequency is decreased in the second satellite by an amount equal to half of the amount of negative Doppler frequency shift to be compensated. Responsive to the first and second satellite approaching each other, the steps further include setting a transmitter laser frequency to a near lowest edge of a fine-tuning range for both satellites, determining an LO laser setting, and tuning the transmitter laser and LO laser to maximize future tuning range. Responsive to the first and second satellite moving away from each other, the steps further include setting a transmitter laser frequency to a near highest edge of a fine-tuning range for both satellites, determining an LO laser setting, and tuning the transmitter laser and LO laser to maximize future tuning range. Only the LO laser is tuned responsive to a maximum Doppler shift not exceeding a maximum frequency tuning range of the LO laser. The satellites can be configured to operate in a constellation. The constellation of satellites can be in Low Earth Orbit (LEO). The constellation of satellites can be in Middle Earth Orbit (MEO).

It will be appreciated that the satellites disclosed in the foregoing sections can include all components described in the present disclosure.

CONCLUSION

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A coherent transceiver for use in a first satellite comprising:
   a transmitter including a modulator configured to modulate a light transmitted by laser;
   a receiver including a Local Oscillator (LO) laser configured to provide a down conversion signal for received signal; and
   circuitry configured to tune a frequency of the transmitter laser and the LO laser based on an amount of Doppler frequency shift to be compensated, wherein only the LO laser is tuned responsive to a maximum Doppler frequency shift not exceeding a maximum frequency tuning range of the LO laser.

2. The coherent transceiver of claim 1, wherein the transmitter laser and the LO laser are tuned in opposite frequency directions.

3. The coherent transceiver of claim 1, wherein the transmitter laser frequency is decreased in the first satellite and the LO laser frequency is increased in a second satellite by an amount equal to half of the amount of positive Doppler frequency shift to be compensated.

4. The coherent transceiver of claim 1, wherein the transmitter laser frequency is increased in the first satellite and the LO laser frequency is decreased in a second satellite by an amount equal to half of the amount of negative Doppler frequency shift to be compensated.

5. The coherent transceiver of claim 1, wherein responsive to the first satellite approaching a second satellite, the circuitry is further configured to:
   set a transmitter laser frequency to a near lowest edge of a fine-tuning range for both satellites,
   determine an LO laser setting, and
   tune the transmitter laser and LO laser to maximize future tuning range.

6. The coherent transceiver of claim 1, wherein responsive to the first satellite moving away from a second satellite, the circuitry is further configured to:
   set a transmitter laser frequency to a near highest edge of a fine-tuning range for both satellites,
   determine an LO laser setting, and
   tune the transmitter laser and LO laser to maximize future tuning range.

7. The coherent transceiver of claim 1, wherein the first satellite is configured to operate in a constellation of satellites.

8. The coherent transceiver of claim 7, wherein the constellation of satellites is in one of a Low Earth Orbit (LEO) and a Middle Earth Orbit (MEO).

9. The coherent transceiver of claim 1, wherein the coherent transceiver is configured to communicate with a ground station.

10. The coherent transceiver of claim 1, further comprising
    circuitry configured to detect a singularity where the first satellite and a second satellite simultaneously arrive close to an orbital crossing.

11. The coherent transceiver of claim 10, wherein the circuitry configured to detect the singularity is further configured to switch the coherent transceiver to communicate with a third satellite based on the singularity.

12. A coherent transceiver for use in a first satellite comprising:
    a transmitter including a modulator configured to modulate a light transmitted by laser;
    a receiver including a Local Oscillator (LO) laser configured to provide a down conversion signal for received signal; and
    circuitry configured to tune a frequency of the transmitter laser and the LO laser in a second satellite based on an amount of Doppler frequency shift to be compensated, wherein one of
      the transmitter laser frequency is decreased in the first satellite and a LO laser frequency is increased in the second satellite by an amount equal to half of the amount of positive Doppler frequency shift to be compensated, or
      the transmitter laser frequency is increased in the first satellite and the LO laser frequency is decreased in the second satellite by an amount equal to half of the amount of negative Doppler frequency shift to be compensated.

13. The coherent transceiver of claim 12, wherein the transmitter laser and the LO laser in the second satellite are tuned in opposite frequency directions.

14. The coherent transceiver of claim 12, wherein the first satellite is configured to operate in a constellation of satellites with the second satellite.

15. The coherent transceiver of claim 12, wherein the coherent transceiver is configured to communicate with a ground station.

16. The coherent transceiver of claim 12, further comprising
    circuitry configured to detect a singularity where the first satellite and the second satellite simultaneously arrive close to an orbital crossing.

17. A coherent transceiver for use in a first satellite comprising:
    a transmitter including a modulator configured to modulate a light transmitted by laser;
    a receiver including a Local Oscillator (LO) laser configured to provide a down conversion signal for received signal; and
    circuitry configured to tune a frequency of the transmitter laser and the LO laser in a second satellite based on an amount of Doppler frequency shift to be compensated, wherein one or more of
      (1) responsive to the first satellite approaching a second satellite, the circuitry is further configured to
        set a transmitter laser frequency to a near lowest edge of a fine-tuning range for both satellites,
        determine an LO laser setting, and
        tune the transmitter laser and LO laser to maximize future tuning range, and
      (2) responsive to the first satellite moving away from a second satellite, the circuitry is further configured to
        set a transmitter laser frequency to a near highest edge of a fine-tuning range for both satellites,
        determine an LO laser setting, and
        tune the transmitter laser and LO laser to maximize future tuning range.

18. The coherent transceiver of claim 17, wherein the transmitter laser and the LO laser in the second satellite are tuned in opposite frequency directions.

19. The coherent transceiver of claim 17, wherein the first satellite is configured to operate in a constellation of satellites with the second satellite.

20. The coherent transceiver of claim 17, wherein the coherent transceiver is configured to communicate with a ground station.

\* \* \* \* \*